(12) United States Patent
Deming, Jr.

(10) Patent No.: US 11,461,560 B2
(45) Date of Patent: Oct. 4, 2022

(54) DEVICES, SYSTEMS, AND METHODS FOR SELECTIVELY PROVIDING CONTEXTUAL LANGUAGE TRANSLATION

(71) Applicant: YAKYAPP CORPORATION, Ruidoso, NM (US)

(72) Inventor: Robert F. Deming, Jr., Ruidoso, NM (US)

( * ) Notice: Subject to any disclaimer, the term of this patent is extended or adjusted under 35 U.S.C. 154(b) by 0 days.

(21) Appl. No.: 16/131,820

(22) Filed: Sep. 14, 2018

(65) Prior Publication Data

US 2019/0251175 A1   Aug. 15, 2019

Related U.S. Application Data

(63) Continuation of application No. PCT/US2017/022144, filed on Mar. 17, 2017.

(60) Provisional application No. 62/308,085, filed on Mar. 14, 2016.

(51) Int. Cl.
| | |
|---|---|
| *G06F 40/58* | (2020.01) |
| *G06Q 50/00* | (2012.01) |
| *G06Q 50/10* | (2012.01) |
| *G06F 40/30* | (2020.01) |
| *G06F 40/45* | (2020.01) |
| *G06F 40/242* | (2020.01) |

(52) U.S. Cl.
CPC ............ *G06F 40/58* (2020.01); *G06F 40/242* (2020.01); *G06F 40/30* (2020.01); *G06F 40/45* (2020.01); *G06Q 50/01* (2013.01); *G06Q 50/10* (2013.01)

(58) Field of Classification Search
CPC .... G06F 17/2735; G06F 40/58; G06F 40/242; G06F 40/30; G06F 40/45; G06Q 50/01; G06Q 50/10
See application file for complete search history.

(56) References Cited

U.S. PATENT DOCUMENTS

| | | | |
|---|---|---|---|
| 9,262,405 B1* | 2/2016 | Baliga | G06Q 30/0255 |
| 2001/0056352 A1* | 12/2001 | Xun | G06F 17/271 |
| | | | 704/277 |
| 2004/0102956 A1* | 5/2004 | Levin | G06F 17/2735 |
| | | | 704/2 |
| 2004/0172235 A1* | 9/2004 | Pinkham | G06F 17/271 |
| | | | 704/2 |
| 2005/0010390 A1* | 1/2005 | Shimohata | G06F 17/2809 |
| | | | 704/5 |

(Continued)

*Primary Examiner* — Abul K Azad
(74) *Attorney, Agent, or Firm* — Lucas & Mercanti, LLP

(57) ABSTRACT

A device includes a memory adapted to store a list in a file or database comprising a plurality of vocabulary words in a first language and, for each vocabulary word, a corresponding word in a second language, a display device, and a processor. The processor is adapted to receive a plurality of words in the first language, select one or more words among the plurality of words, based on one or more predetermined criteria, translate, match or equate the one or more selected words from the first language to words of the second language, and cause the display device to display the plurality of words, wherein one or more first words that are in the plurality of words and are not among the one or more selected words which are displayed in the first language and one or more second words that are in the plurality of words and are among the one or more selected words are displayed in the second language.

4 Claims, 40 Drawing Sheets

(56) References Cited

U.S. PATENT DOCUMENTS

| | | | |
|---|---|---|---|
| 2005/0267734 A1* | 12/2005 | Masuyama | G06F 17/2827 704/2 |
| 2008/0288241 A1* | 11/2008 | Noda | G09B 19/06 704/4 |
| 2013/0110494 A1* | 5/2013 | Elgazzar | G06F 17/28 704/3 |
| 2017/0017642 A1* | 1/2017 | Cunningham | G06F 17/289 |

* cited by examiner

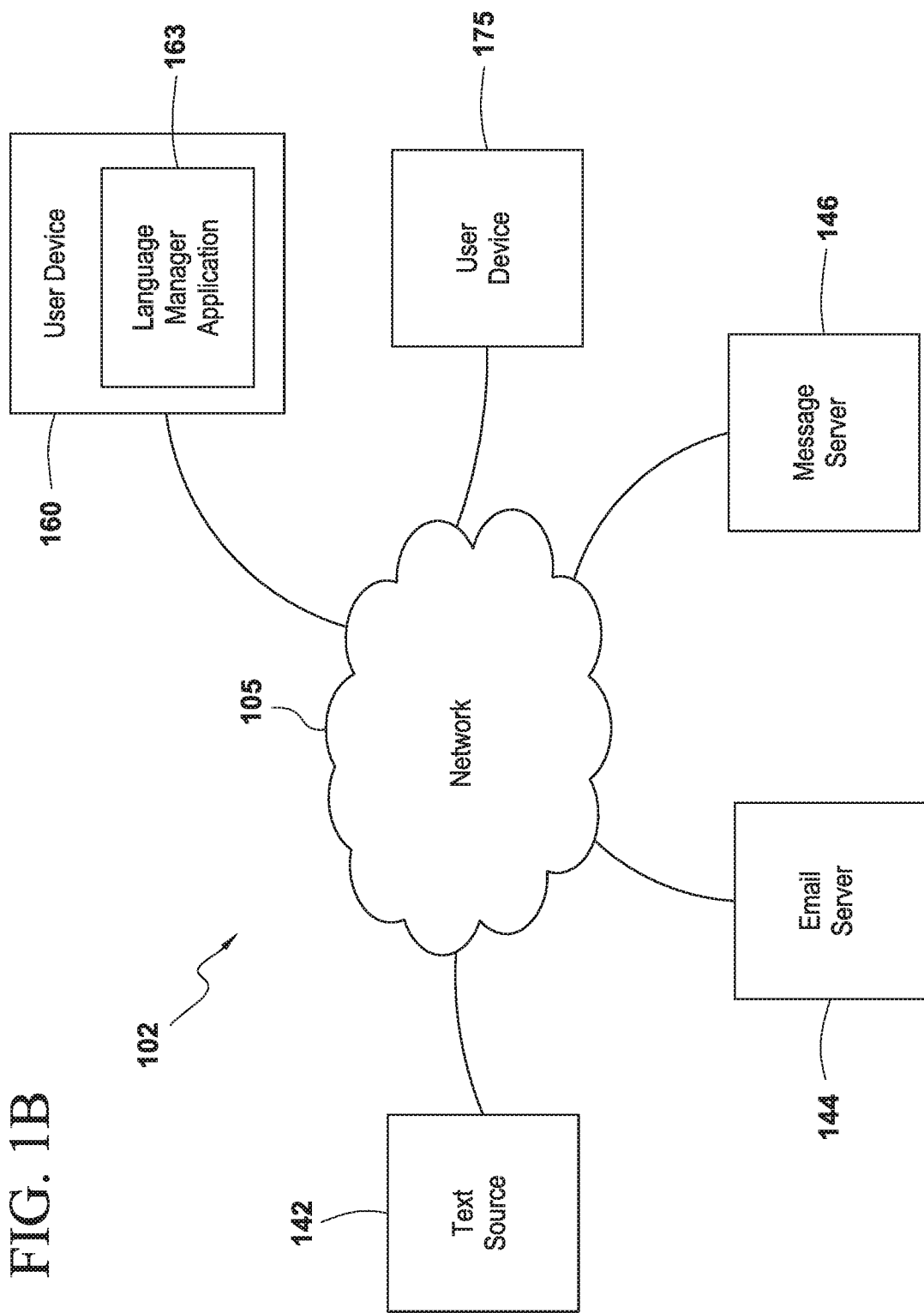

BASIC SPANISH WORDS

| | |
|---|---|
| Hello | Hola |
| Thank You | Gracias |
| Food | Comida |
| Drink | Bebida |
| Money | Dinero |
| Nice | Agradable |
| House | Casa |
| Pretty | Bella |
| Need | Necesitar |
| I | Yo |
| You | Uested |
| They | Ellos |
| Here | Aqui |
| There | Ya Esta |
| Go | Ir |
| Sleep | Sueno |
| Town | Ciudad |
| Car | Coche |
| Bus | Autobus |
| Land | Tierra |
| Hotel | Hotel |
| Water | Agua |

DEVICES, SYSTEMS, AND METHODS FOR SELECTIVELY PROVIDING CONTEXTUAL LANGUAGE TRANSLATION

CROSS REFERENCE TO RELATED APPLICATIONS

This application is a continuation of International Application PCT/US2017/022144 filed Mar. 13, 2017, which claimed the priority of U.S. Provisional Application No. 62/308,085, filed Mar. 14, 2016, the contents of both applications are incorporated herein by reference.

TECHNICAL FIELD

This specification relates generally to text processing, and more particularly to devices, systems, and methods for selectively translating words in a text from a first language to a second language.

BACKGROUND

Many people wish to become familiar with a small number of words of a foreign language and may find that the most convenient bridge to another language is to experientially add one or a few words at a time from another language within the language they currently speak; they may or may not require of themselves to go further to learn the foreign language fluently. For example, many citizens of the U.S. enjoy learning and using a few words of Spanish (e.g., bueno, casa, perro, hombre, cerveza, etc.) but do not have a desire to go further and learn the grammar of the language, immerse themselves in the language, etc. Learning even a small number of words in a foreign language can be fun, intellectually stimulating, and can facilitate interaction with people of a different culture and language.

There are currently a number of different well-known approaches to learning a foreign language. One can of course take a class in the foreign language. Alternatively, many commercial products such as audio tapes, books, etc., designed to teach various languages to non-native speakers. Existing commercial products for learning foreign languages include Babbel, Transparent Language, Softissimo, Reverso Context, Berlitz, Pimsler, Rosetta Stone, Duolingo, etc. However, classes, audio tapes, websites, applications, learning programs and books typically are designed to provide a structured evolutionary academic experience for the serious student who wishes to achieve fluency in the foreign language. For example, classes, audio tapes, websites, applications, learning programs, books, etc. usually follow a formal step-by-step, benchmark-driven teaching program designed to teach grammar and vocabulary in increasingly advanced stages, to enable the student to attain increasingly advanced levels of fluency. Existing resources and methods are not optimized to simply familiarize a student with a limited number of words of the foreign language.

For the person who wishes to familiarize himself or herself with a small number of words of a foreign language but does not wish to learn grammar or other aspects of the language, there is a need for improved systems and methods for doing so. Some in the field of foreign language teaching hold that one effective way of learning vocabulary words of a foreign language is for a student to continue speaking in his or her native language and then "pick up" words in the desired foreign language through robust progressive sampling and contextual usage of vocabulary and phrases of the foreign language as in the informal method practiced in border situations around the world—such as the Southwestern border of the United States and Mexico. It is believed that speaking parts of the desired foreign language within the context of one's own language gives an individual a greater opportunity to enter the other language and communicate with at least pieces of that language more rapidly and comfortably.

Today, if a user (without the opportunity to travel to a foreign country) wishes to learn a limited number of words of a foreign language, and incorporate that vocabulary into his or her daily activities and communications, among the few resources available are online translation systems. However, such translation systems generally translate an entire sentence or paragraph or text from one language to another, including those words that are known to the user and those words that are not known to the user. It has been found that use of such translating systems and experiential methods and algorithms are likely to serve as a crutch and do not provide effective practice at using the vocabulary of the desired foreign language. As a result, existing "complete translators" often become a vehicle for mere incidental usage, and are unable to guide the user through an effective stage of initial familiar orientation.

Accordingly, there is an ongoing need for systems and methods for helping a person, who may be a student, a traveler, a professional, etc.—easily and quickly familiarize himself or herself with a limited number of vocabulary words of a foreign language, without, at least, the initial internal expectation of learning grammar or other aspects of the language.

SUMMARY

In accordance with an embodiment, a device includes a memory adapted to store a list comprising a plurality of vocabulary words in a first language and, for each vocabulary word, a corresponding word in a second language, a display device, and a processor. The list may be stored in a database, file or other data structure. The processor is adapted to receive a plurality of words in the first language, select one or more words among the plurality of words, based on one or more predetermined criteria, translate the one or more selected words from the first language to the second language; and cause the display device to display the plurality of words, wherein one or more first words that are in the plurality of words and are not among the one or more selected words are displayed in the first language and one or more second words that are in the plurality of words and are among the one or more selected words are displayed in the second language—in the context of a displayed communication of the first or base language.

In one embodiment, the processor is further adapted to receive from a user information specifying the first language and the second language.

In another embodiment, the processor is further adapted to receive from the user a selection of a predetermined group of words, and select words among the plurality of words that are also in the predetermined group of words.

In another embodiment, a base language phonetic or pinyin interpretation of the sound of the second language is displayed as part of the translated words to the second language within the plurality of words of the base and second language when the transliterated words are not familiar to the user of the base language.

In another embodiment, the predetermined group of words include a plurality of vocabulary words associated with a particular activity or interest.

In another embodiment, the processor is further adapted to receive from the user a selection of a social media platform in which the user wishes to send and receive messages and apply contextual language translation functions to the messages.

In another embodiment, the plurality of words are in one of: an email message, a tweet, a SMS message, an instant message, a text message, a web page, an article, a document, and a message posted on a social media platform.

In another embodiment, for each of the one or more second words, a first version of the respective second word transliterated from the second language into a writing system associated with the first language, and a second version of the respective second word displayed in a writing system associated with the second language, are displayed on the display device.

In another embodiment, the user may specify a percentage of words in the original communication or message that are to be translated. The processor then translates words in the communication or message in accordance with the specified percentage.

In accordance with another embodiment, a system includes a display device adapted to display text, a memory adapted to store information specifying a first language, a second language, and one or more predetermined criteria, and a processor. The processor is adapted to receive a plurality of words in the first language, select one or more words among the plurality of words, based on the one or more predetermined criteria, translate the one or more selected words from the first language to the second language, and cause the display device to display the plurality of words, wherein one or more first words that are in the plurality of words and are not among the one or more selected words are displayed in the first language and one or more second words that are in the plurality of words and are among the one or more selected words which are displayed in the second language.

In one embodiment, the processor is further adapted to receive from a user the information specifying the first language and the second language, and store the information in the memory.

In another embodiment, processor is further adapted to receive from the user a selection of a predetermined group of words, and select words among the plurality of words that are also in the predetermined group of words.

In another embodiment, the predetermined group of words include a plurality of vocabulary words associated with a particular activity.

In another embodiment, the processor is further adapted to receive from the user a selection of a social media platform in which the user wishes to send and receive messages and apply contextual language translation functions to the messages.

In another embodiment, the plurality of words are in one of: an email message, a tweet, a SMS message, an instant message, a text message, a web page, an article, a document, and a message posted on a social media platform.

In another embodiment, the plurality of words are in one of: an email message, a tweet, a SMS message, an instant message, a text message, a web page, an article, a document, and a message.

In another embodiment, the one or more first language words and the one or more second language words are sent or broadcast to a plurality of users via a social media platform.

In another embodiment, the processor is further adapted to translate the one or more selected words from the first language to the second language, by a processor residing and operating on one of a user device, an email server, and a social media platform.

In another embodiment, for each of the one or more second words, a first version of the respective second word transliterated from the second language into a writing system associated with the first language and a second version of the respective second word displayed in a writing system associated with the second language, are displayed.

In accordance with an embodiment, a method is provided. A plurality of words in a first language is received. One or more words among the plurality of words are selected, based on one or more predetermined criteria. The one or more selected words are translated from the first language to the second language. A display device is caused to display the plurality of words, wherein one or more first words that are in the plurality of words and are not among the one or more selected words are displayed in the first language and one or more second words that are in the plurality of words and are among the one or more selected words are displayed in the second language.

In another embodiment, information specifying the first language and the second language is received from a user.

In another embodiment, a selection of a predetermined group of words is received from the user.

In another embodiment, words among the plurality of words that are also in the predetermined group of words are selected.

In another embodiment, the predetermined group of words include a plurality of vocabulary words associated with a particular activity.

In another embodiment, a selection of a social media platform in which the user wishes to send and receive messages and apply contextual language translation functions to the messages is received from the user.

In another embodiment, the plurality of words are in one of: an email message, a tweet, a SMS message, an instant message, a text message, a web page, an article, a document, and a message posted on a social media platform.

In another embodiment, the one or more selected words are translated from the first language to the second language, by a processor residing and operating on one of a user device, a server, an email server, and a social media platform.

In another embodiment, a display device is caused to display the plurality of words, wherein one or more first words that are in the plurality of words and are not among the one or more selected words are displayed in the first language and one or more second words that are in the plurality of words and are among the one or more selected words are displayed in the second language. For each of the one or more second words, a first version of the respective second word transliterated from the second language into a writing system associated with the first language and a second version of the respective second word displayed in a writing system associated with the second language, are displayed.

In accordance with an embodiment, a text message posted by a first user on a social media platform is intercepted or received, wherein the text message includes a plurality of words in a first language, before the message is displayed on the social media platform. One or more words among the plurality of words are selected, based on one or more predetermined criteria. The one or more selected words are translated from the first language to the second language. The text message is caused to be posted on the social media platform, wherein first words that are in the plurality of words and are not among the one or more selected words are posted in the first language and second words that are in the plurality of words and are among the one or more selected words are posted in the second language. A second user device is caused to display a prompt to download software adapted to translate a portion of the text message into a third language. A request to download the software is received from the second user device. The software is downloaded to the second user device, in response to the request.

In another embodiment, the device is a stand-alone device that is not connected to a communication network. In another embodiment, the processor is a stand-alone application that is not connected to a communication network. The device or processor may alternatively communicate with a network when connected thereto and, when not connected to the network, offer a standalone contextual language translation function.

In another embodiment, a contextual language translation processor is a component of a custom keyboard application available for a smartphone. In another embodiment, a contextual language translation processor is a component of a keyboard application operating in a browser of a personal computer, a laptop computer, or tablet device.

In another embodiment, a processor or platform that provides cartoons and puzzles for conventional print media, and/or a social media illustration platform such as Pinterest, displays a plurality of first language words and selectively translated second language words in accordance with one or more predetermined criteria. The predetermined criteria may be associated with a phonetic or pinyin interpretation of the transliterated second words within the cartoon, puzzle, or illustration.

In another embodiment, a message containing first words in a first language and second words in a second language. In response to a selection of the user or other criteria, the entire message may be translated into the first language, entirely into the second language, or entirely into a third language.

In another embodiment, selected words within a text are translated into emojis (which are well-known symbolic representations of words and are frequently used in email messages, text messages, etc.). The partially translated message containing words and emojis is sent to a recipient, posted on a social media website, etc.

In another embodiment, words of the first language are displayed with words of the second language and the replaced words of the first language are also displayed.

In another embodiment, a percentage or portion of a message that is to be translated may be controlled by a user by adjusting graphical indicator displayed on a page, such as a slider, a dial, a pointer, etc., or by typing a percentage number into a designated field on a page, or in another manner.

These and other advantages of the present disclosure will be apparent to those of ordinary skill in the art by reference to the following Detailed Description and the accompanying drawings.

BRIEF DESCRIPTION

FIG. 1B shows a communication system in accordance with another embodiment;

FIG. 4 shows a list of words in a first language cross-referenced with corresponding words in a second language in accordance with an embodiment;

DETAILED DESCRIPTION

In accordance with an embodiment, a device includes a memory adapted to store a list comprising a plurality of vocabulary words in a first language and, for each vocabulary word, a corresponding word in a second language, a display device, and a processor. The processor is adapted to receive a plurality of words in the first language, select one or more words among the plurality of words, based on one or more predetermined criteria, translate the one or more selected words from the first language to the second language; and cause the display device to display the plurality of words, wherein one or more first words that are in the plurality of words and are not among the one or more selected words are displayed in the first language and one or more second words that are in the plurality of words and are among the one or more selected words are displayed in the second language.

Figure 1A:
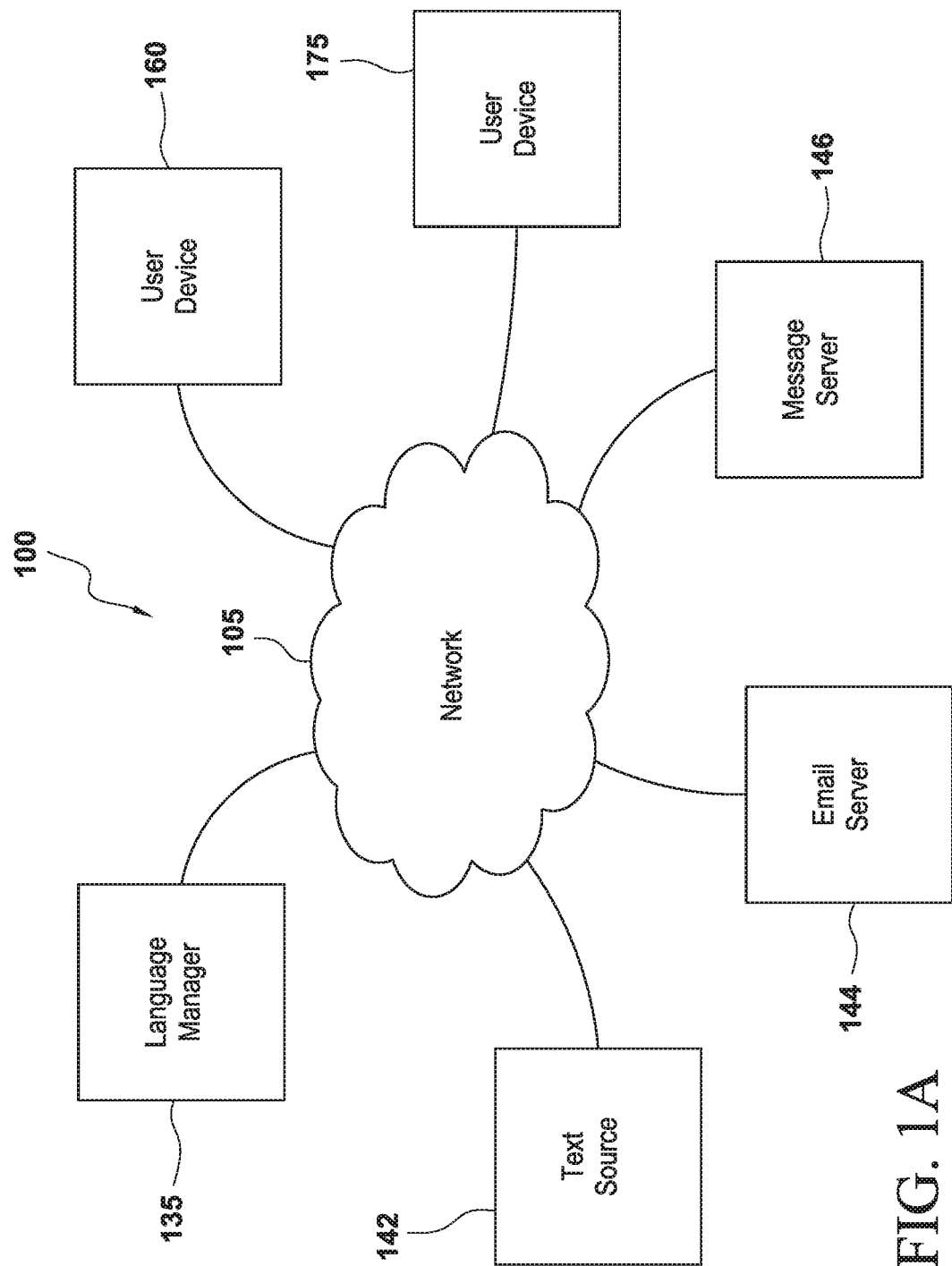
FIG. 1A shows a communication system in accordance with an embodiment.

FIG. 1A shows a communication system in accordance with an embodiment. Communication system 100 includes a network 105, a language manager 135, a text source 142, an email server 144, a message server 146, a first user device 160 and a second user device 175.

Network 105 may include any type of network, such as the Internet, a local area network, a wide areas network, a wireless network, a cellular network, a storage area network, etc. Network 105 may include a combination of networks of different types.

Text source 142 may be any source of text material that may be accessed via network 105. For example, text source 142 may be a website that provides web pages containing text articles, text messages, comments, blogs, etc. Alternatively, text source 142 may be a source of research material, a database containing text material, etc. Text source 142 may reside and operate on a server computer or other type of processor.

Email server 144 is any type of email server that provides standard email services. Thus, email server 144 may allow a user to create an email account, receive email messages from other user, and create and send email messages to other users. Email server 144 may reside and operate on a server computer or other type of processor.

Message server 146 is a message server that provides other types of message services. For example, message server 146 may allow users to send and receives short messages, tweets, instant messages, text messages, email messages, images, videos, documents, etc. Message server 146 may allow users to send and receive messages in a variety of formats and on a variety of platforms such as Twitter, Facebook, Snapchat, SMS messaging systems, Instant Messenger, WhatsApp, Skype, Gmail, Yahoo, online Outlook, Office Outlook, MS Word, etc. Message server 146 may reside and operate on a server computer or other type of processor.

Each of user devices 160, 175 is a processing device that allows a user to access network 105 and communicate with other devices via network 105. For example, each user device 160, 175 may be a personal computer, a laptop device, a cell phone, etc. Each user device 160, 175 allows a user to access text source 142 via network 105 in order to access text materials. Each user device 160, 175 allows a user to access email server 144 and/or message server 146 via network 105 in order to send and receive email messages and/or other types of messages.

Language manager 135 provides selected language translation services. For example, from time to time, language manager 135 analyzes text material obtained by a user device from text source 142, an email message or other message created by a user device, or an email message or other message received by a user device, and translates selected words therein from a first language to a second language. Language manager 135 may from time to time access a message received or generated by email server 144 and/or message server 146 and apply a contextual language translation function to the message. Language manager 135 may cause the user device to display the text or message, with only the selected words translated into the second language. Language manager 135 may reside and operate on a server computer or other type of processor.

FIG. 1B shows a communication system in accordance with another embodiment. Communication system 102 includes network 105, text source 142, email server 144, message server 146, first user device 160 and second user device 175.

In the illustrative embodiment of FIG. 1B, user device 160 includes a language manager application 163. Language manager application 163 is a software application that resides and operates on user device 160. For example, language manager application may be a cell phone App. Alternatively, language manager application 163 may be software that resides and operates within a browser operating on user device 160. Language manager application 163 analyzes text material obtained by user device 160 from text source 142, text within an email message or other message created by user device 160, or text within an email message or other message received by user device 160, and translates selected words therein from a first language to a second language. Language manager application 163 may cause user device 160 to display the text or message, with only the selected words translated into the second language.

Figure 2:
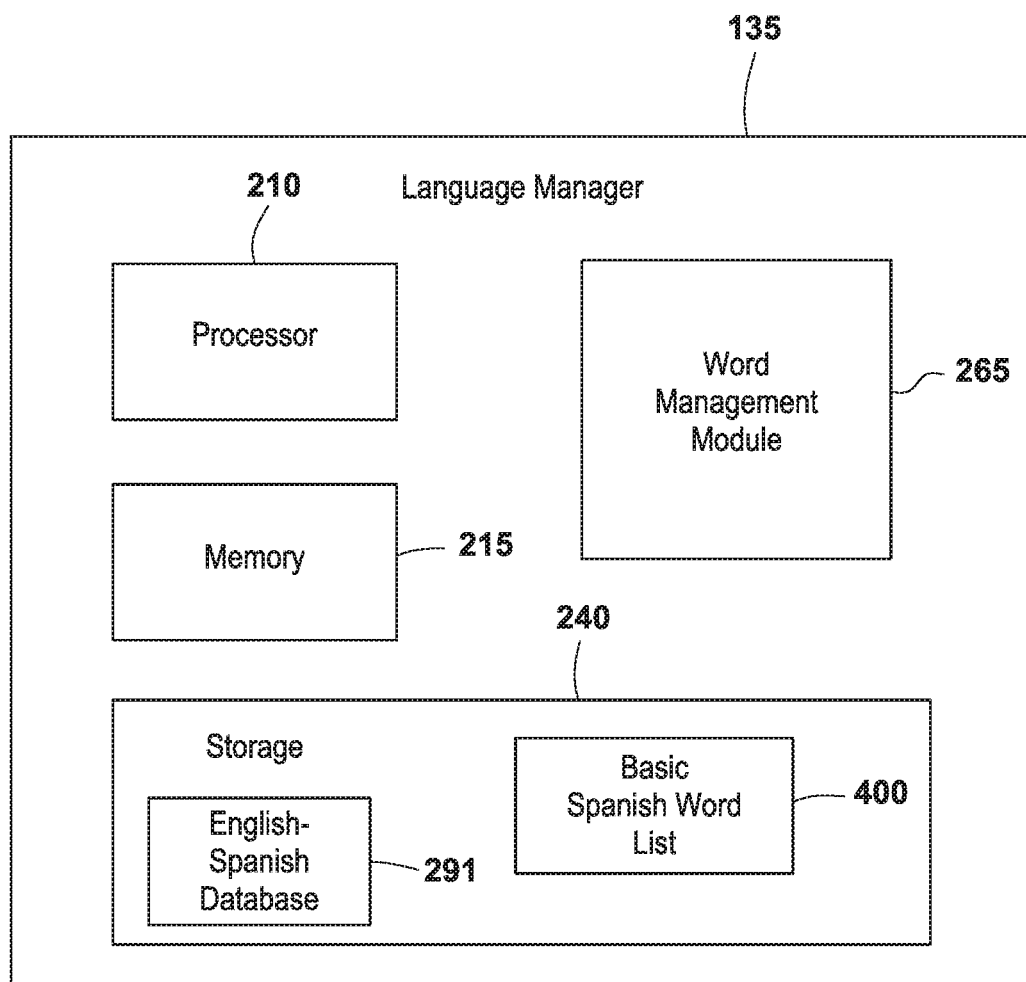
FIG. 2 shows components of a language manager in accordance with an embodiment.

FIG. 2 shows components of language manager 135 in accordance with an embodiment. Language manager 135 includes a processor 210, a memory 215, a storage 240, and a word management module 265. Processor 210 orchestrates and controls other components of language manager 135. Memory 215 is used by components of language manager 135 to store data. Storage 240 is also used by components of language manager 135 to store data. Word management module 265 from time to time translates selected words of text from a first language to a second language.

In the illustrative embodiment of FIG. 2, language manager 135 translates selected words of selected texts from English into Spanish. For this purpose, language manager 135 includes an English-Spanish database 291, which is stored in storage 240. In other embodiments, language manager 135 may translate selected words from any first language to any second language. Language manager 135 may accordingly store dictionaries related to any language or languages, and may include lists of words of any first language cross-referenced to words of any second language.

Figure 3:
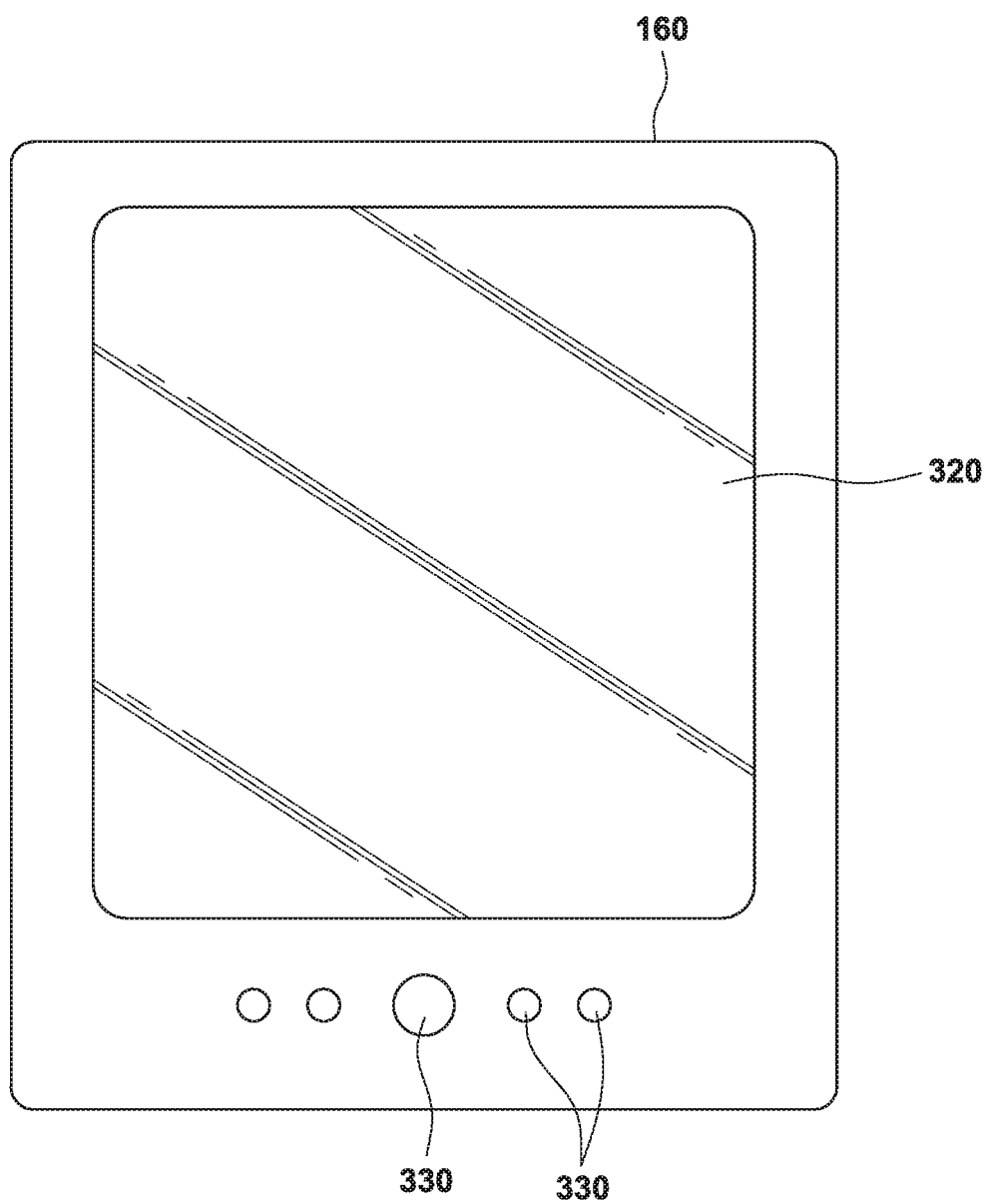
FIG. 3 shows a user device in accordance with an embodiment.

FIG. 3 shows user device 160 in accordance with an embodiment. User device 160 includes a display device 320 and a plurality of controls 330. In the illustrative embodiment, controls 330 are buttons.

Language manager 135 also uses a one or more predetermined lists of words to provide translation services. For example, language manager 135 may use a list of English words cross-referenced to corresponding Spanish words, such as that shown in FIG. 4. List 400 includes a list of selected words that are commonly used in Spanish, and their English equivalents. In other embodiments, lists of words of other languages may be used. List 400 may be stored in a database, file, object, or other data structure. List 400 may be encoded. Other methods of data storage may be used.

Figure 5:
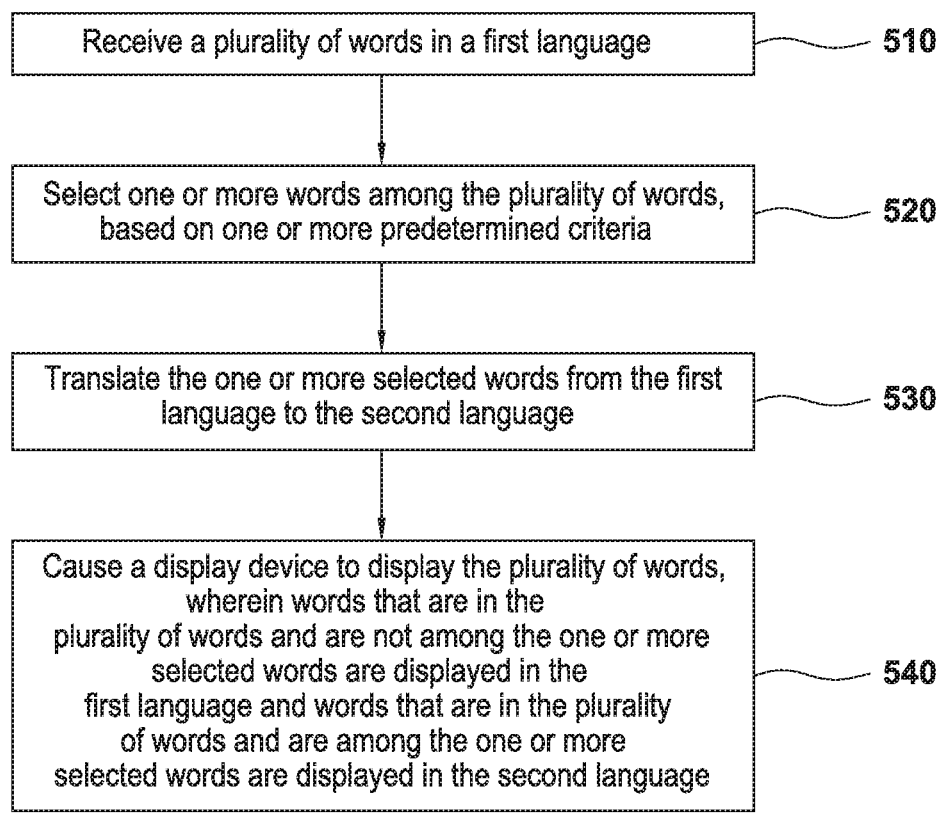
FIG. 5 is a flowchart of a method in accordance with an embodiment.

In accordance with an embodiment, selected words from a text are translated from a first language to a second language, and the partially-translated text is displayed. FIG. 5 is a flowchart of a method in accordance with an embodiment.

Figure 6A:
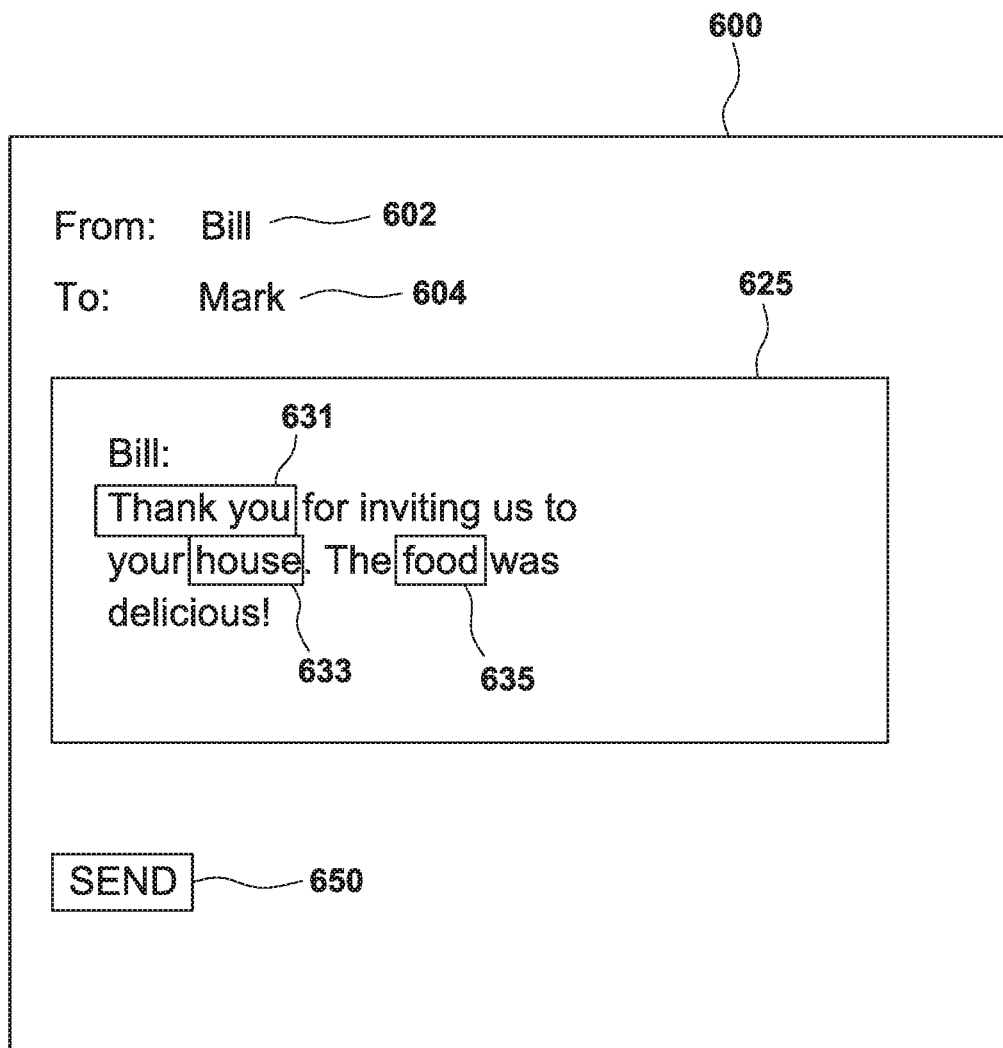
FIG. 6A shows a page showing an email message in accordance with an embodiment.

In an illustrative embodiment, a first user (Bill) employing user device 160 communicates with a second user (Mark) employing user device 175. Suppose that the second user composes an email message such as that shown in FIG. 6A, addressed to the first user. FIG. 6A shows a page 600 showing an email message in accordance with an embodiment. Page 600 includes a sender field 602, a recipient field 604, and a message field 625. The message includes the sentences: "Thank you for inviting us to your house. The food was delicious!" The second user selects a SEND button 650, and thereby sends the email message to the first user. In a well-known manner, the email message is sent to the first user's email account maintained by email server 144.

At step 510, a plurality of words in a first language is received. In the illustrative embodiment, language manager 135 (shown in FIG. 1A) accesses and obtains the email message while the email message is stored at email server 144 (and before the email message is sent to the first user's account).

At step 520, one or more words among the plurality of words are selected, based on one or more predetermined criteria. Language manager 135 examines the email message to determine if any of the words in the email message are present in list 400. In particular, language manager 135 determines if any of the English words listed in list 400 are in the email message. Any such word is selected as a word to be translated. In the illustrative embodiment of FIG. 6A, language manager 135 determines that the word 631 ("Thank you"), word 633 ("house"), and word 635 ("food") are present in list 400.

At step 530, the one or more selected words are translated from the first language to the second language. For each selected word, language manager 135 determines the equivalent Spanish word. For example, language manager 135 may utilize list 400 to translate the selected words. Thus, in the illustrative embodiment, language manager 135 determines that the translation of "Thank you" is "Gracias," the translation of "house" is "casa," and the translation of "food" is "comida." In one embodiment, a partially-translated version of the message is generated and sent to the first user's email account. In the partially-translated version of message 625, the selected words are translated into Spanish but the remaining words are in English.

Figure 6B:
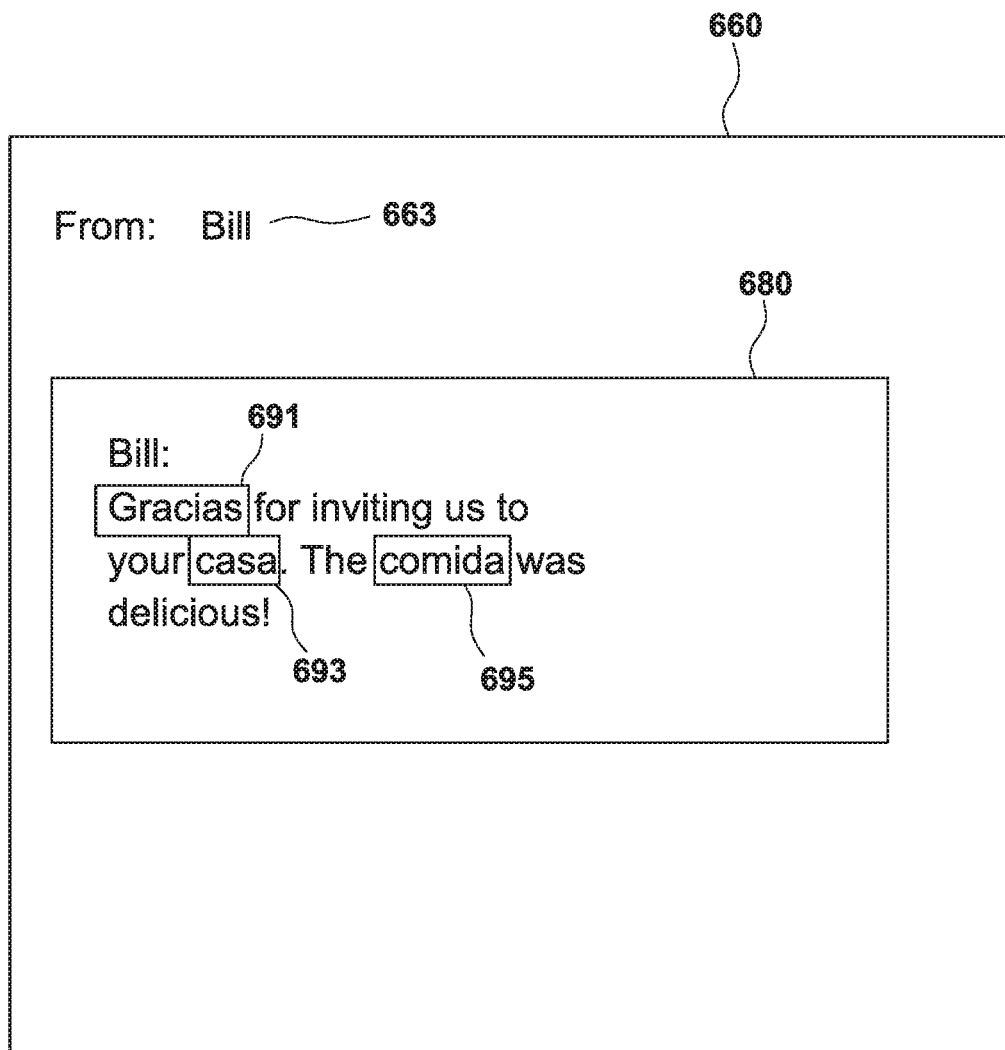
FIG. 6B shows a page showing the email message of FIG. 6A after selected words have been translated from a first language to a second language in accordance with an embodiment.

At step 540, a display device is caused to display the plurality of words, wherein words that are in the plurality of words and are not among the one or more selected words are displayed in the first language and words that are in the plurality of words and are among the one or more selected words are displayed in the second language. When the first user employs user device 160 to access the email message in the email account at email server 144, email server 144 causes user device 160 to display the partially-translated email message. FIG. 6B shows a page 660 showing the partially-translated email message as it may be displayed on user device 160. Page 660 includes a sender field 663 and a message field 680. Word 691 ("Gracias"), word 693 ("casa"), and word 695 ("comida") are shown in Spanish, while the remainder of the message is shown in English.

Referring again to FIG. 1B, in another illustrative embodiment, language manager application 163 (residing on user device 160) performs some or all of the functions of language manager 135. Language manager application 163 may store one or more word lists such as list 400 (shown in FIG. 4). Suppose again that a first user employing user device 160, in which language manager application 163 resides and operates, communicates with the second user employing user device 175. Suppose again that the second user composes an email message such as that shown in FIG. 6A, addressed to the first user. In a well-known manner, the email message is sent to the first user's email account maintained by email server 144.

In one embodiment, when the first user accesses the email account at email server 144, language manager application 163 (in user device 160) obtains the email message. Language manager application 163 examines the email message to determine if any of the words in the email message are present in list 400. In particular, language manager application 163 determines if any of the English words listed in list 400 are in the email message. Any such word is selected as a word to be translated. In the illustrative embodiment of FIG. 6A, language manager application 163 determines that the word 631 ("Thank you"), word 635 ("house"), and word 635 ("food") are present in list 400.

For each selected word, language manager application 163 determines the equivalent Spanish word. For example, language manager application 163 may utilize list 400 to translate the selected words. Thus, in the illustrative embodiment, language manager application 163 determines that the translation of "Thank you" is "Gracias," the translation of "house" is "casa," and the translation of "food" is "comida."

Language manager application 163 causes user device 160 to display the email message with the selected words translated, but the remaining words shown in English. FIG. 6B shows the email message as it may be displayed on user device 160. Page 660 includes a sender field 663 and a message field 680. Word 691 ("Gracias"), word 693 ("casa"), and word 695 ("comida") are shown in Spanish, while the remainder of the message is shown in English.

Figure 16:
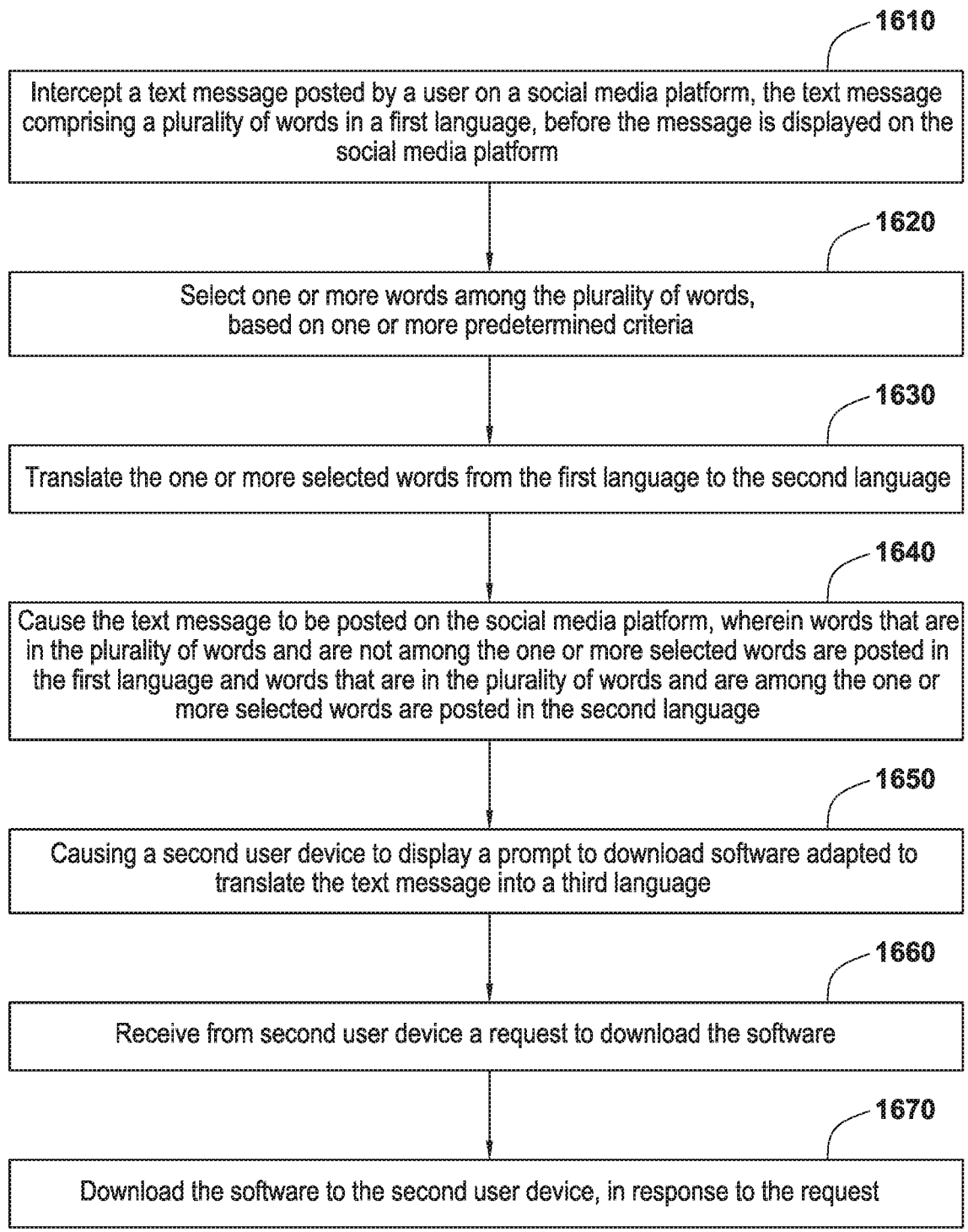
FIG. 16 is a flowchart of a method in accordance with an embodiment.

In various embodiments, the method steps described herein, including the method steps described in FIG. 5 and/or FIG. 16, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 5 and/or FIG. 16, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
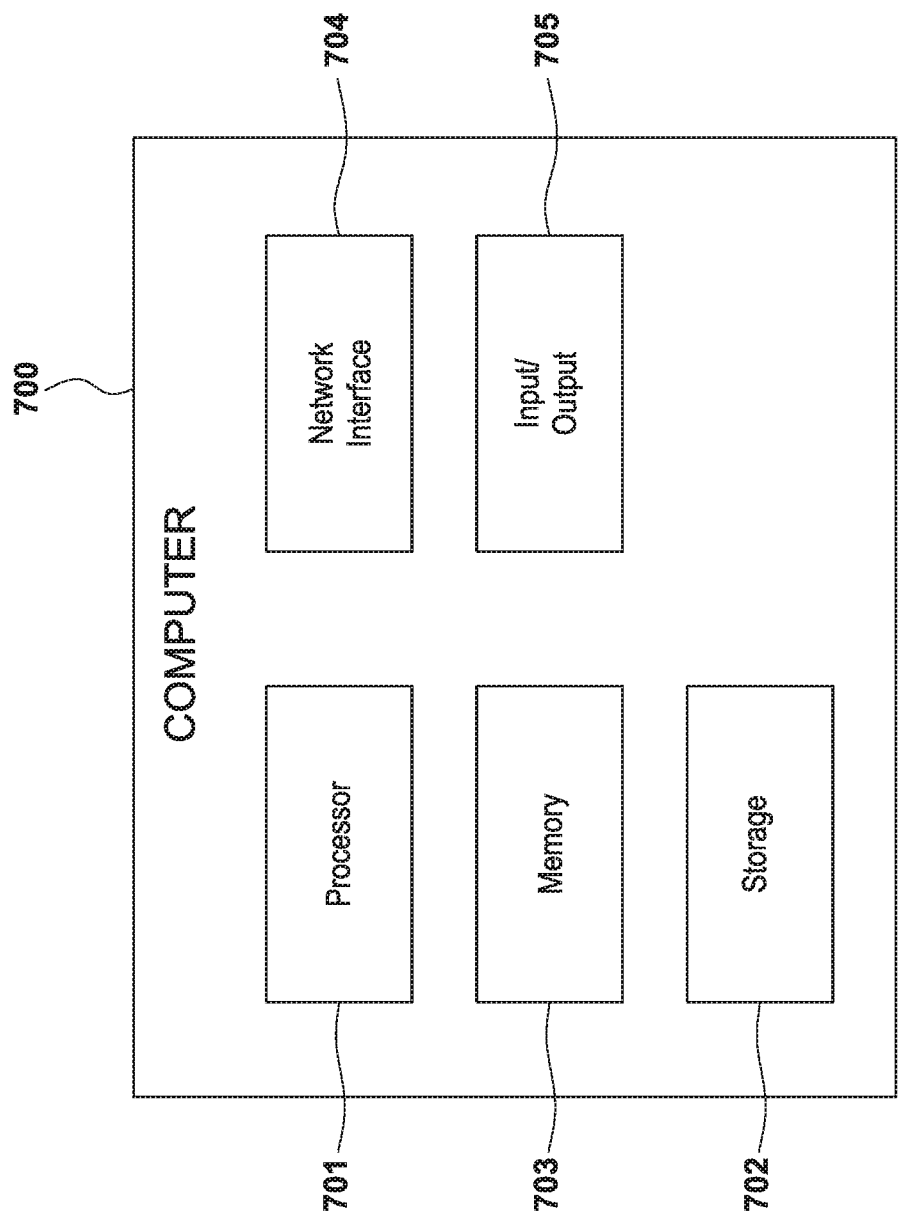
FIG. 7 shows components of an exemplary computer in accordance with an embodiment.

A high-level block diagram of an exemplary computer that may be used to implement systems, apparatus and methods described herein is illustrated in FIG. 7. Computer 700 includes a processor 701 operatively coupled to a data storage device 702 and a memory 703. Processor 701 controls the overall operation of computer 700 by executing computer program instructions that define such operations. The computer program instructions may be stored in data storage device 702, or other computer readable medium, and loaded into memory 703 when execution of the computer program instructions is desired. Thus, the method steps of FIG. 5 and/or FIG. 16 can be defined by the computer program instructions stored in memory 703 and/or data storage device 702 and controlled by the processor 701 executing the computer program instructions. For example, the computer program instructions can be implemented as computer executable code programmed by one skilled in the art to perform an algorithm defined by the method steps of FIG. 5 and/or FIG. 16. Accordingly, by executing the computer program instructions, the processor 701 executes an algorithm defined by the method steps of FIG. 5 and/or FIG. 16. Computer 700 also includes one or more network interfaces 704 for communicating with other devices via a network. Computer 700 also includes one or more input/output devices 705 that enable user interaction with computer 700 (e.g., display, keyboard, mouse, speakers, buttons, etc.).

Processor 701 may include both general and special purpose microprocessors, and may be the sole processor or one of multiple processors of computer 700. Processor 701 may include one or more central processing units (CPUs), for example. Processor 701, data storage device 702, and/or memory 703 may include, be supplemented by, or incorporated in, one or more application-specific integrated circuits (ASICs) and/or one or more field programmable gate arrays (FPGAs).

Data storage device 702 and memory 703 each include a tangible non-transitory computer readable storage medium. Data storage device 702, and memory 703, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 705 may include peripherals, such as a printer, scanner, display screen, smartphone, etc. For example, input/output devices 705 may include a display device such as a cathode ray tube (CRT) or liquid crystal display (LCD) monitor for displaying information to the user, a keyboard, and a pointing device such as a mouse or a trackball by which the user can provide input to computer 700.

Any or all of the systems and apparatus discussed herein, and components thereof, may be implemented using a computer such as computer 700.

One skilled in the art will recognize that an implementation of an actual computer or computer system may have other structures and may contain other components as well, and that FIG. 7 is a high level representation of some of the components of such a computer for illustrative purposes.

The principles of contextual language translation may be implemented in many different systems and arrangements. Some embodiments for implementing contextual language translation are illustrated in FIGS. 8A-8E.

Figure 8A:
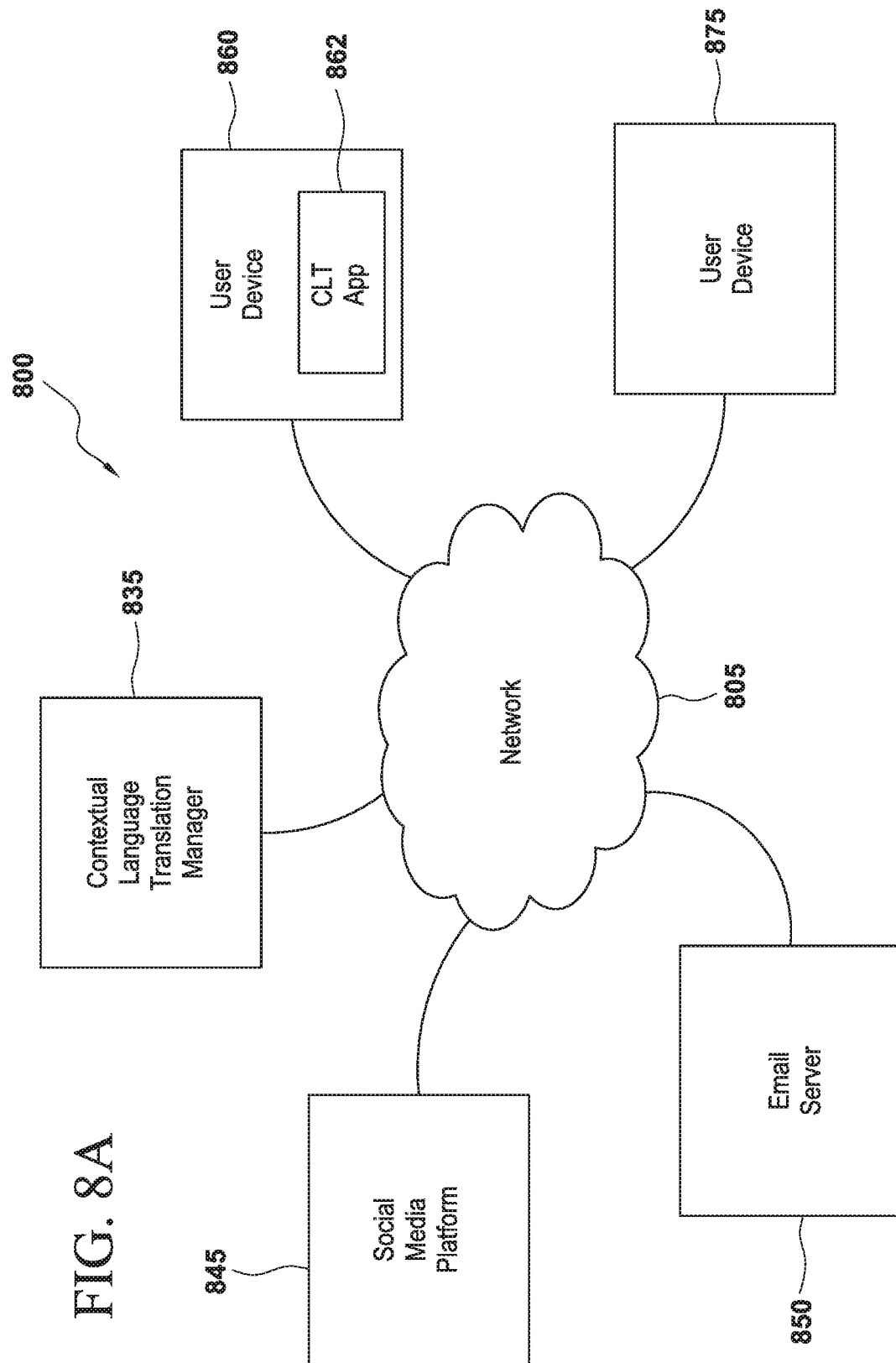
FIG. 8A shows a communication system in accordance with an embodiment.

FIG. 8A shows a communications system in accordance with one embodiment. Communications system 800 includes a network 805, a social media platform 845, a contextual language translation manager 835, an email server 850, a user device 860, and a user device 875.

Network 805 may include one or more networks. For example, network 805 may include the Internet, a local area network, a wide areas network, a wireless network, a cellular network, a storage area network, etc. Network 805 may include a combination of networks of different types.

Social media platform 845 includes a social media platform available to a plurality of user via network 805. Social media platform 845 includes a user posting function that allows users to post text messages, images, videos, and/or other data to the social media platform. When a user posts a text message, image, video, or other data on a page or other channel maintained by social media platform 845, other users may view and respond to the message, image, video, or data. For example, social media platform 845 may be a well-known social media platform such as Facebook, Instagram, Twitter, Snapchat, Skype, VK or VKontakte or ВКонтакте, RenRen or 人人網, etc., or may be a different social media platform. Social media platform 845 may reside and operate on one or more server computers, or on another type of processing devices.

Contextual language translation manager 835 from time to time receives text including a plurality of words in a first language, and selectively translates one or more of the words into a second language. Contextual language translation manager 835 may then transmit the resulting (partially-translated) message to another device, or may cause another device to display the resulting message. Contextual language translation manager 835 may also provide to another device software (which may be in the form of an "App" or in another form) adapted to receive text that includes a plurality of words in a first language and selectively translate one or more of the words into a second language. Contextual language translation manager 835 may reside and operate on one or more server computers, or on another type of processing devices. Contextual language translation manager 835 may maintain a website available via the Internet.

Email server 850 allows users to maintain an email account and send and receive email messages. Email server 850 may be available via the Internet or may be an email server maintained in a private network. Email server 850 may reside and operate on one or more server computers, or on another type of processing devices.

User device 860 is a processing device such as a personal computer, laptop device, tablet device, smartphone, cell phone, etc. User device 860 includes a contextual language translation App 862 adapted receive text that includes a plurality of words in a first language and selectively translate one or more of the words into a second language. In another embodiment, user device 860 includes a browser containing software having contextual language translation functions.

User device 875 is a processing device such as a personal computer, laptop device, tablet device, smartphone, cell phone, etc.

Figure 8B:
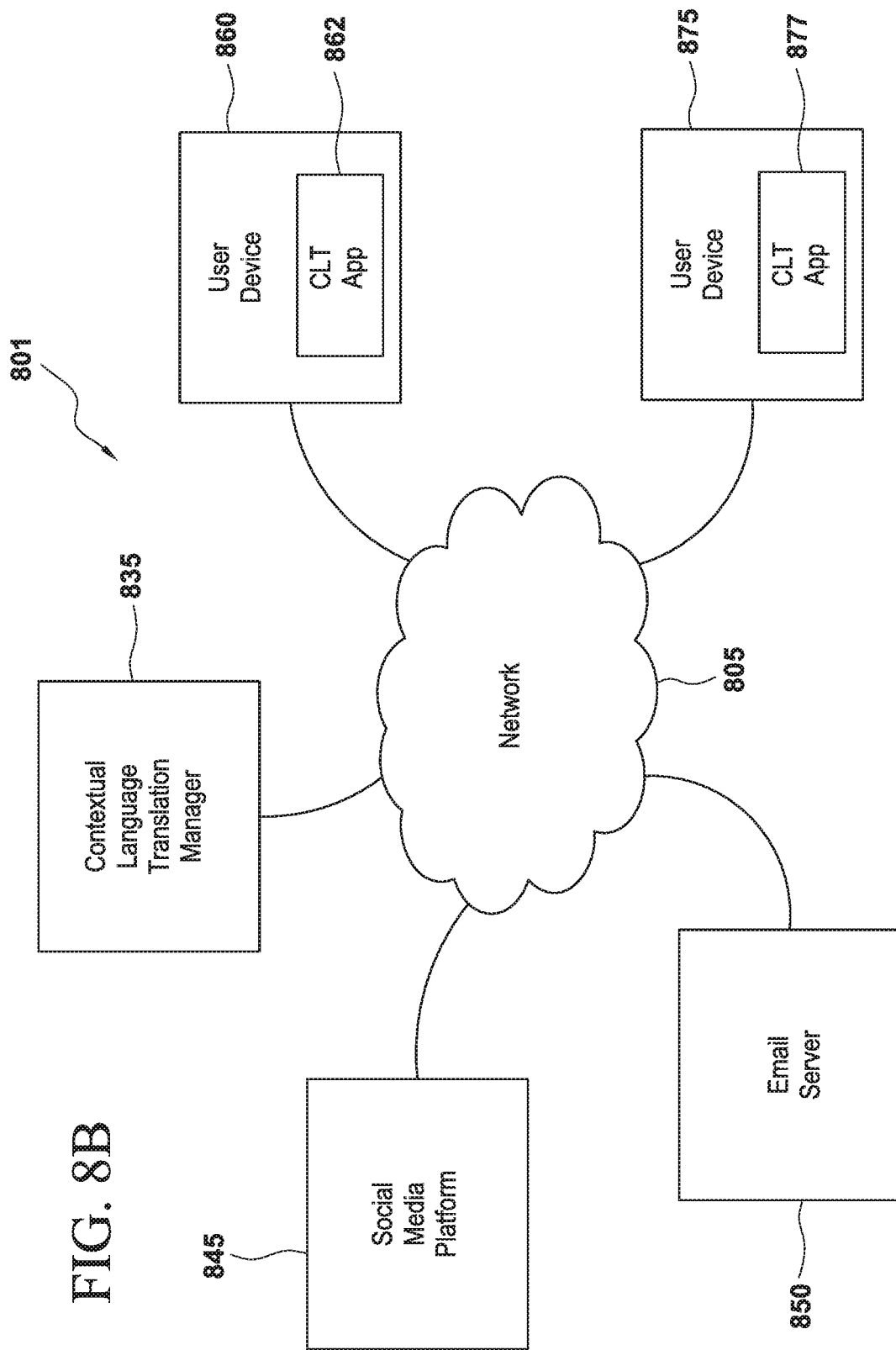
FIG. 8B shows a communication system in accordance with an embodiment.

FIG. 8B shows a communication system in accordance with another embodiment. Communication system 801 includes components similar to those of FIG. 8A. In this embodiment, user device 860 includes a contextual language translation application (CLT App) 862 and user device 875 includes a CLT App 877. Each CLT App is adapted to perform a context language translation function.

Figure 8C:
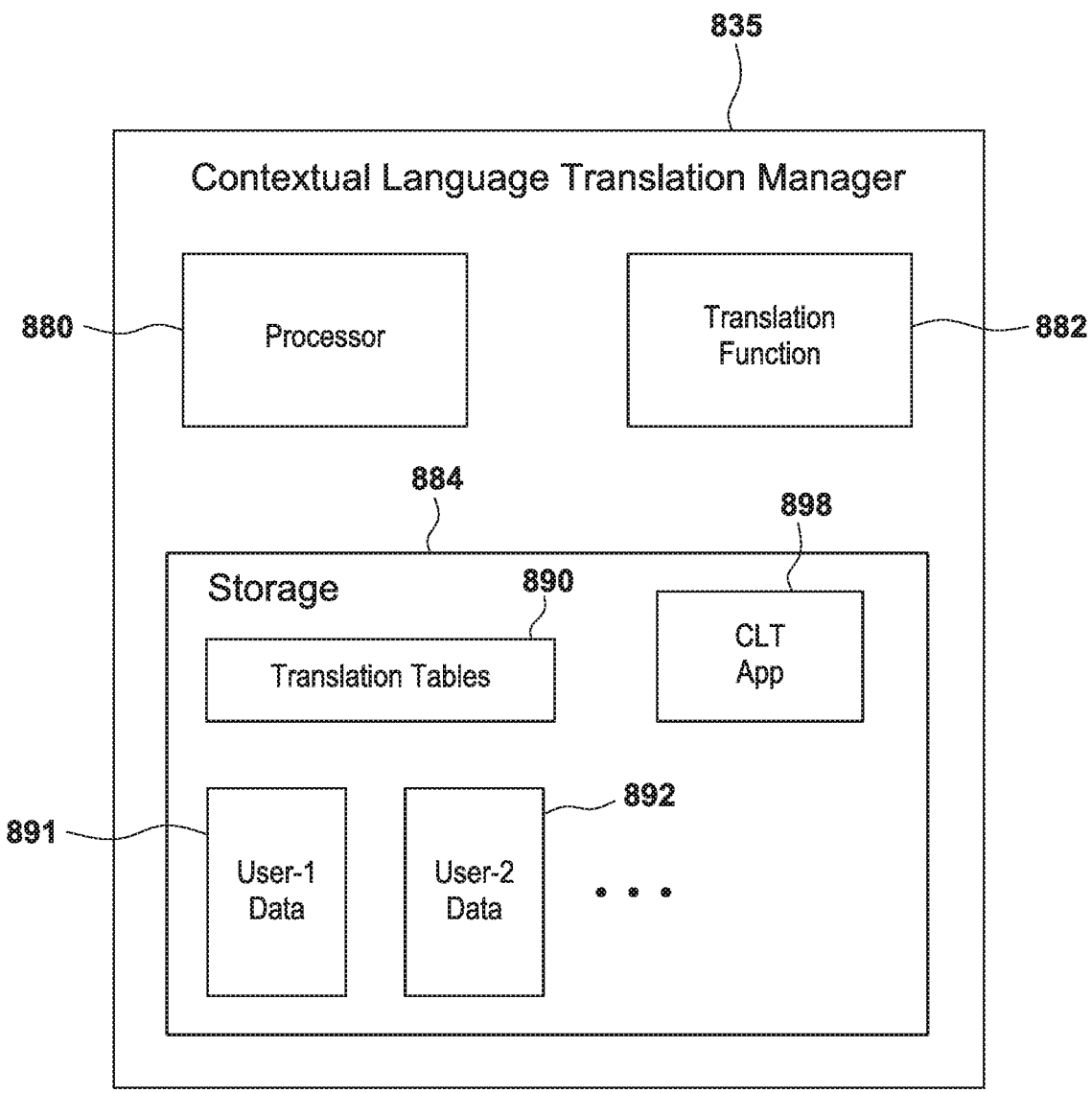
FIG. 8C shows components of a contextual language translation manager in accordance with an embodiment.

FIG. 8C shows components of contextual language translation manager 835. Contextual language translation manager 835 includes a processor 880, a translation function 882, and a storage 884. Processor 880 orchestrates the operations of various components of contextual language translation manager 835. Storage 884 stores various types of data. For example, storage 884 maintains one or more translation tables 890 that cross-reference words in a first language to corresponding words in one or more second languages. For example, translation tables may include a list such as list 400 shown in FIG. 4. Translation tables 890 may be stored in one or more databases, files, objects or other data structure. Other methods of data storage may be used.

Translation manager 882 from time to time examines a text and translates one or more words in the text from a first language to a second language. Translation function 882 may access translation tables 890 in storage 884 to perform a translation function.

Storage 884 also stores a contextual language translation (CLT) App 898 which is software adapted to examine a text and translates one or more words in the text from a first language to a second language. From time to time, contextual language translation manager 835 may download to update or change a version of CLT App 898 to a user device. Different versions of CLT App 898 designed to run on different user devices may be stored. For example, a first version for Android devices and a second version for iOS devices may be stored.

Figure 8D:
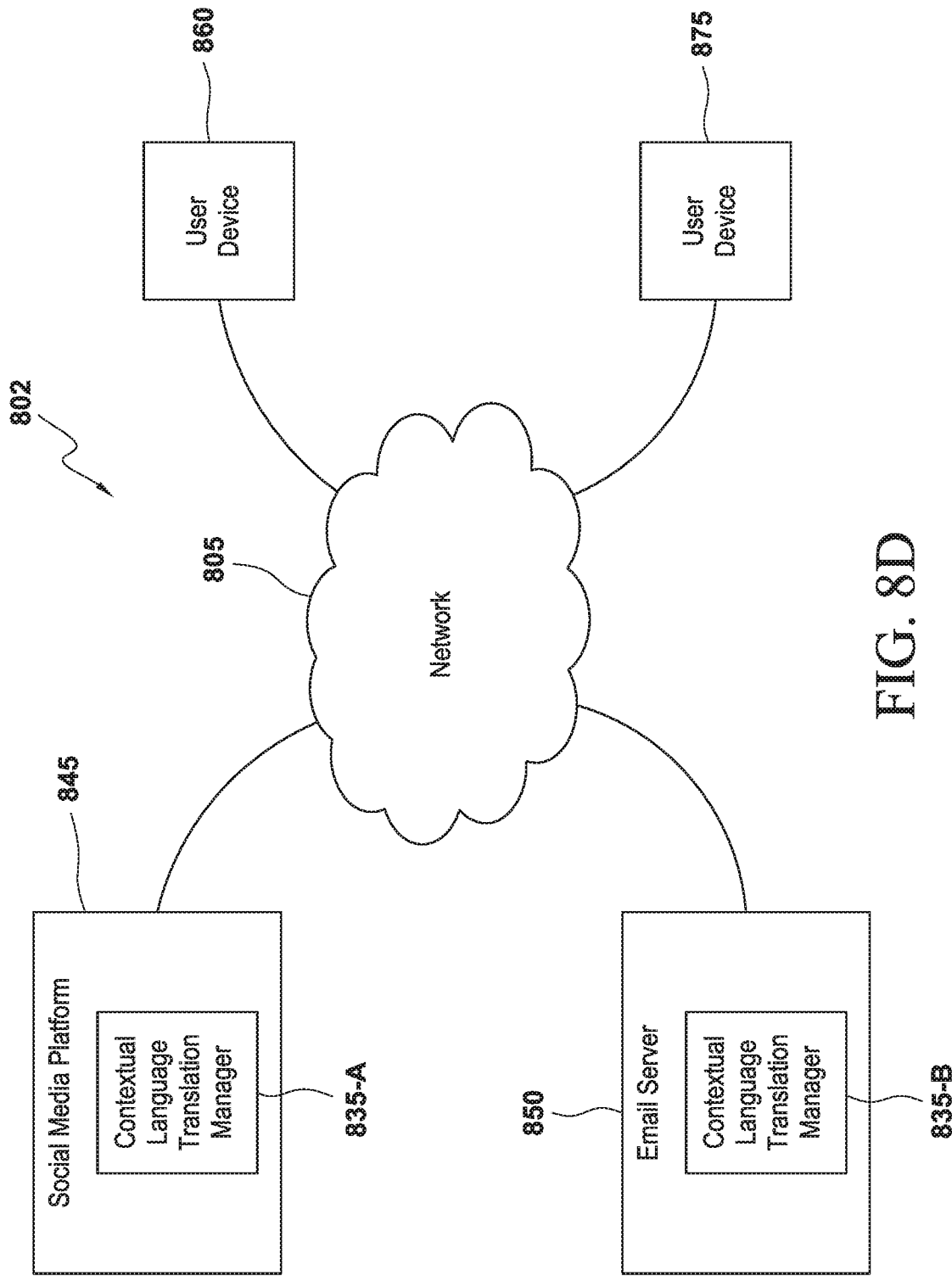
FIG. 8D shows a communication system in accordance with an embodiment.

In some embodiments, contextual language translation manager 835 may function as a part of (or reside within) another processor or entity. For example, FIG. 8D shows a communication system in accordance with another embodiment. Communication system 802 includes network 805, social media platform 845, email server 850, user device 860, and user device 875. A contextual language translation manager 835-A resides and operates in social media platform 845, and a contextual language translation manager 835-B resides and operates in email server 850. For example, contextual language translation manager 835-A may reside in the API of social media platform 845, and contextual language translation manager 835-B may reside in the API of email server 850.

In one embodiment, a communication system may include portions of communication system 800 shown in FIG. 8A and portions of communication system 802 shown in FIG. 8D. For example, a communication system may include a network such as network 805, a contextual language translation manager independent of any social media platform or email server, such as contextual language translation manager 835 (which may maintain a website that can be accessed via network 805 by a user device), a contextual language translation manager residing within a social media platform, such as contextual language translation manager 835-A (which may perform translation functions with respect to messages posted on the social media platform), and a contextual language translation manager residing within an email server, such as contextual language translation manager 835-B (which may perform translation functions with respect to email messages).

Figure 8E:
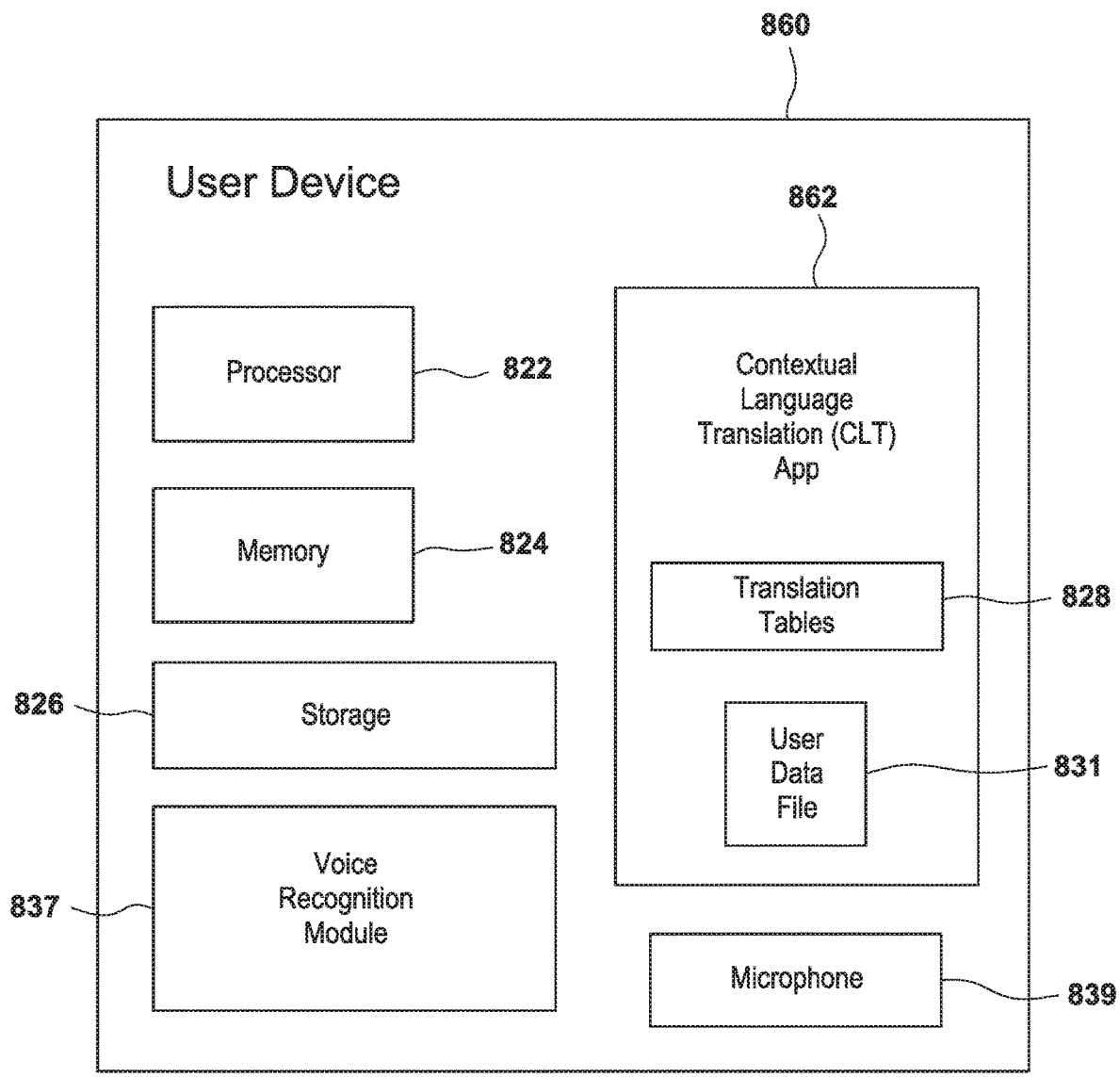
FIG. 8E shows components of a user device in accordance with an embodiment.

FIG. 8E shows components of user device 860 that includes a contextual language translation App in accordance with an embodiment. User device 860 includes a processor 822, a memory 824, a storage 826, and a contextual language translation (CLT) App 862. Processor 822 orchestrates the operations of various components of user device 860. Memory 824 is used by components of user device 860 to store data. Storage 826 stores various types of data. CLT App 862 performs contextual language translation functions. CLT App 862 stores translation tables 828, which include one or more lists of vocabulary words in a first language cross-referenced (or otherwise linked to) corresponding words in a second language. For example translation tables 828 may include a list such as list 400 (shown in FIG. 4). CLT App 862 also stores a user data file 831, in which a user's selections and other data associated with a particular user may be stored. Translation tables 828 may be stored in one or more databases, files, objects, or other data structure. Other methods of data storage may be used.

In another embodiment, user device 860 includes a browser having functionality similar to that of CLT App 862.

User device 860 also includes a microphone 839 and a voice recognition module 837. Voice recognition module 837 analyzes voice signals received by microphone 839 and converts the voice signals into text. Methods of voice recognition are well-known.

Figure 9:
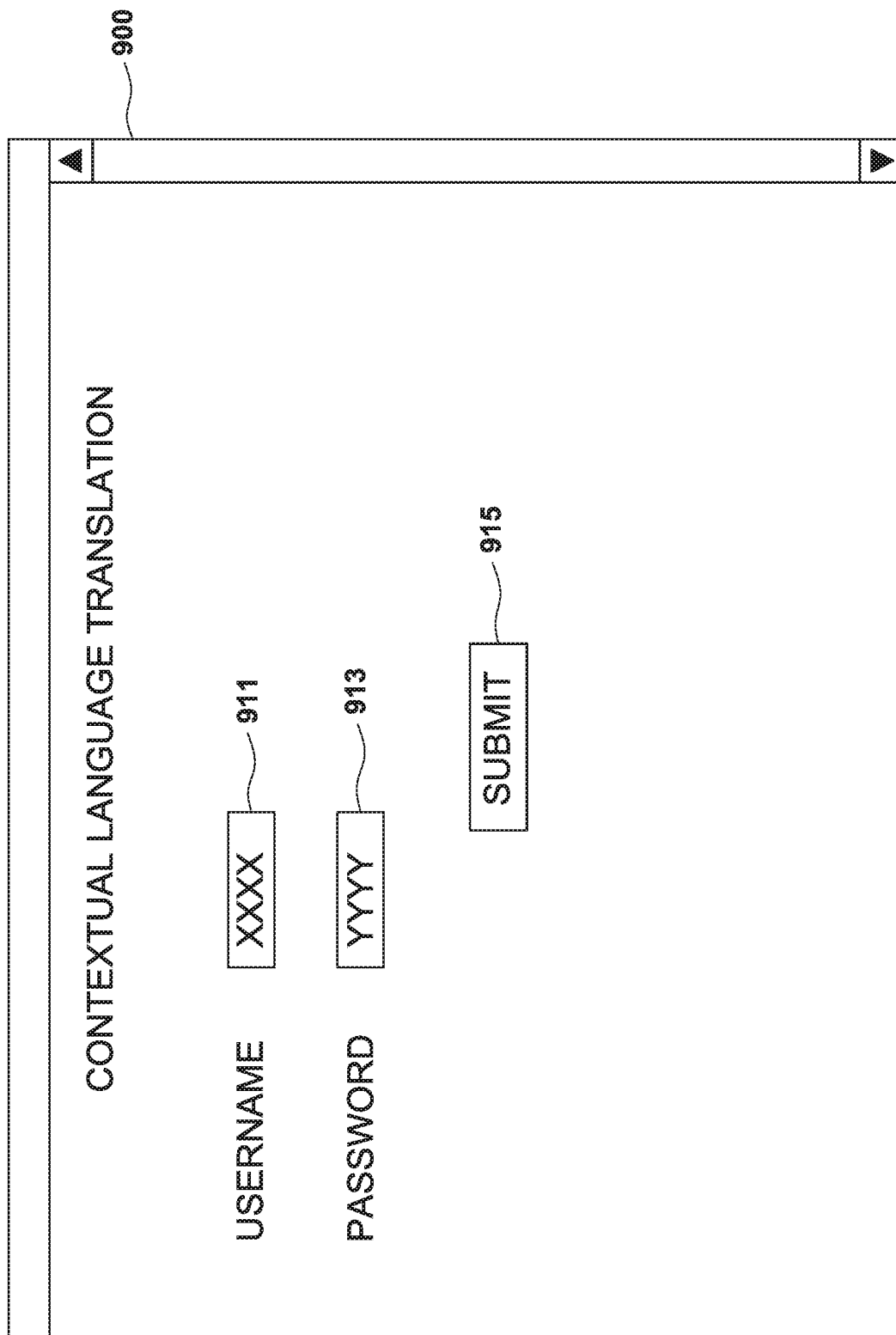
FIG. 9 shows a page that includes a field in which a user may enter a username and a field in which the user may enter a password in accordance with an embodiment.

In accordance with an embodiment, a user accesses contextual language translation manager 835 to selectively translate one or more words in a text. Suppose, for example, that a third user named "John Doe," employing user device 860, accesses a website associated with contextual language translation manager 835 via the Internet. When the third user accesses the website, contextual language translation manager 835 generates a page such as that shown in FIG. 9. Page 900 includes a field 911 in which the third user may enter a username and a field 913 in which the third user may enter a password. The third user then presses a SUBMIT or SEND button 915. Contextual language translation manager 835 now allows the third user to access his account, or creates an account for the third user, if necessary.

Figure 10:
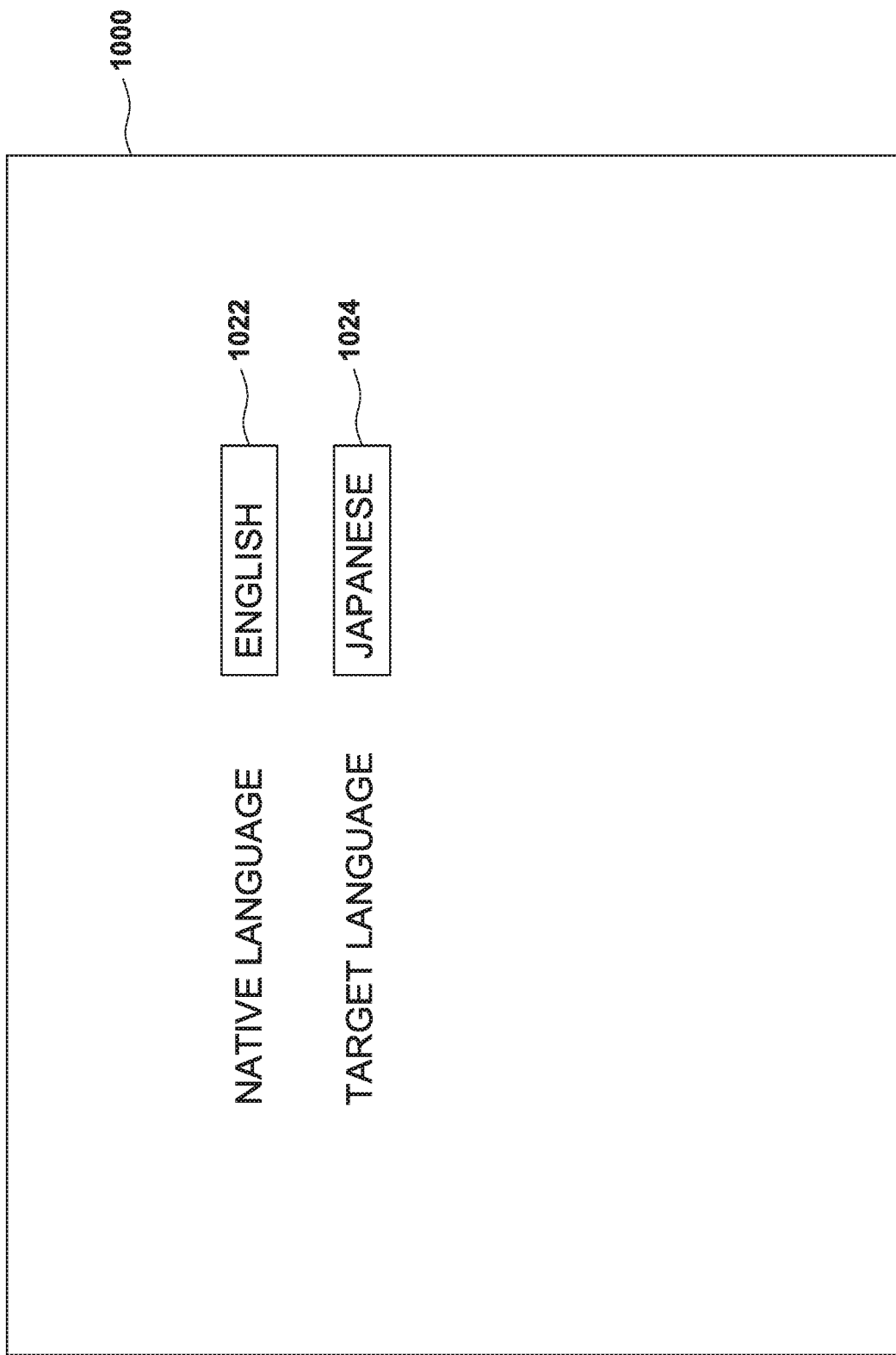
FIG. 10 shows a page that includes a field in which a user may specify a native language, and a field in which the user may specify a target language in accordance with an embodiment.

Contextual language translation manager 835 may generates a page such as that shown in FIG. 10. Page 1000 includes a field 1022 in which the third user may specify his native language, and a field 1024 in which the third user may specify a target language. As used herein, the target language is the language that a user wishes to familiarize himself or herself with by experiencing the selective contextual language translation functions provided by contextual language translation manager 835. In the illustrative embodiment, the third user specifies ENGLISH as the native language and JAPANESE as the TARGET LANGUAGE. In the illustrative embodiment of FIG. 8C, processor 880 (of contextual language translation manager 835) stores the third user's username, password, and language selections in a User-1 Data file 891 within storage 884. CLT App 862 may store the user's information in User Data File 831.

Figure 11A:
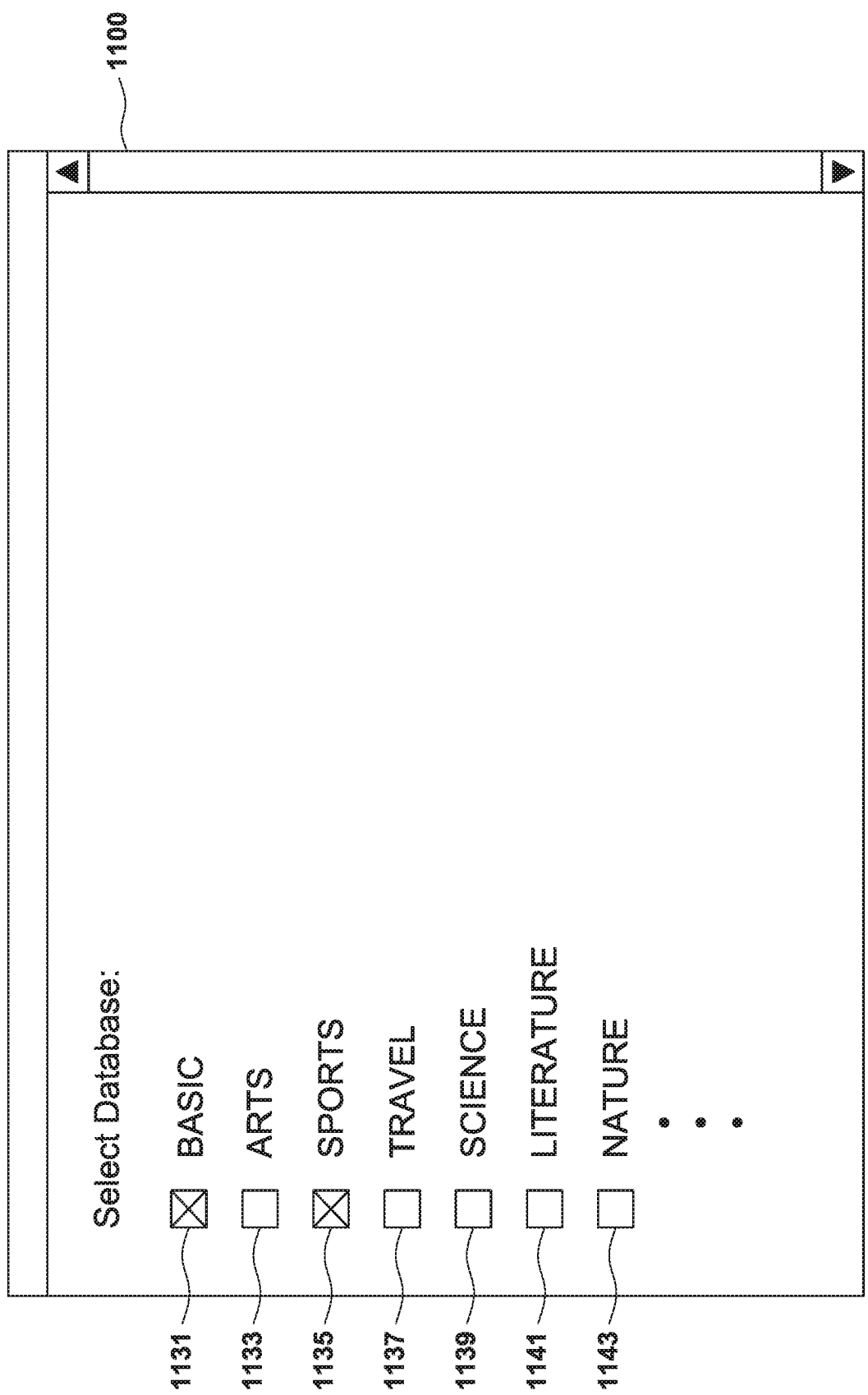
FIG. 11A shows a page that displays a list of different vocabulary databases that a user may choose to include in contextual language translations in accordance with an embodiment.

Contextual language translation manager 835 now generates a page such as that shown in FIG. 11A. Page 1100 displays a list of different vocabulary databases that a user may choose to include in his or her contextual language translations. Each database represents a list of words associated with a particular activity. For example, if a user wishes only simple words relating to everyday objects that are used on a daily basis to be translated, the user may select the BASIC database 1131. If a user wishes that words relating to a specialized field of activity be translated, the user may specify one or more such fields. Thus, in the illustrative embodiment, ARTS (1133), SPORTS (1135), TRAVEL (1137), SCIENCE (1139), LITERATURE (1141), NATURE (1143), etc., are displayed and may be selected by the user. In the illustrative embodiment, the third user ("John Doe") selects the BASIC (1131) and SPORTS (1135) databases. In the illustrative embodiment, the third user selects the BASIC database (1131) and the SPORTS database (1135). The third user's selections are stored in a file such as User-1 Data file 891. CLT App 862 may store the user's information in User Data File 831.

Figure 11B:
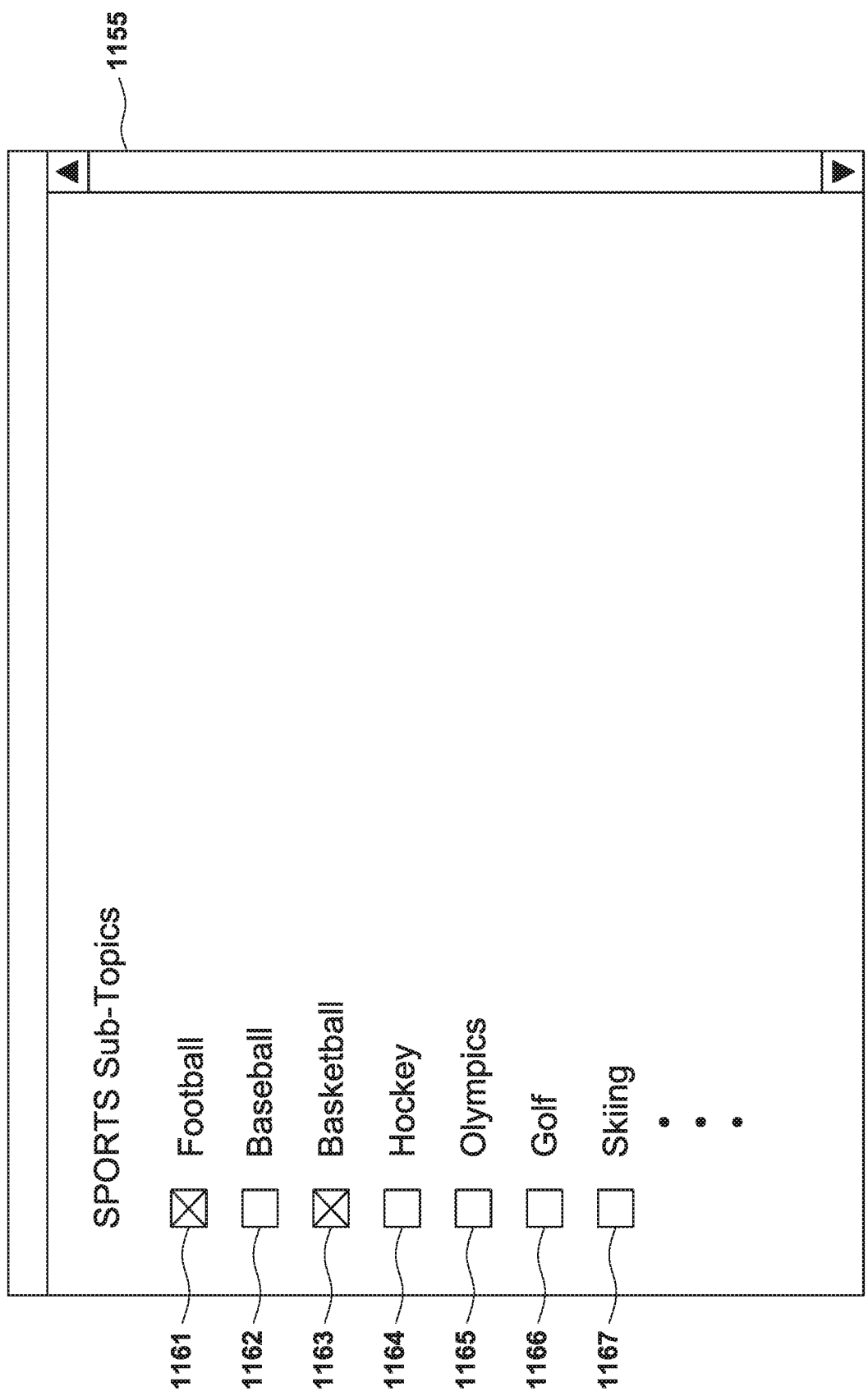
FIG. 11B shows a page that displays a list of sub-topics associated with different vocabulary databases that a user may choose to include in contextual language translations in accordance with an embodiment.

Because the third user selected the SPORTS database (1135), contextual language translation manager 835 now presents a list such as that shown in FIG. 11B. FIG. 11B shows a page 1155 displaying a plurality of sub-topics in the SPORTS database. The user may select his or her interest in sports and choose as the translatable vocabulary of the second or target language—the hierarchical level of SPORTS or may select from a list of sub-topics. Each sub-topic listed represents a list of specialized words associated with the respective sub-topic. Thus, page 1155 displays football (1161), Baseball (1162), Basketball (1163), Hockey (1164), Olympics (1165), Golf (1166), Skiing (1167), etc. The third user selects Basketball (1163) and Skiing (1167). The third user's selections are stored in a file such as User-1 Data file 891. CLT App 862 may store the user's information in User Data File 831.

Figure 12:
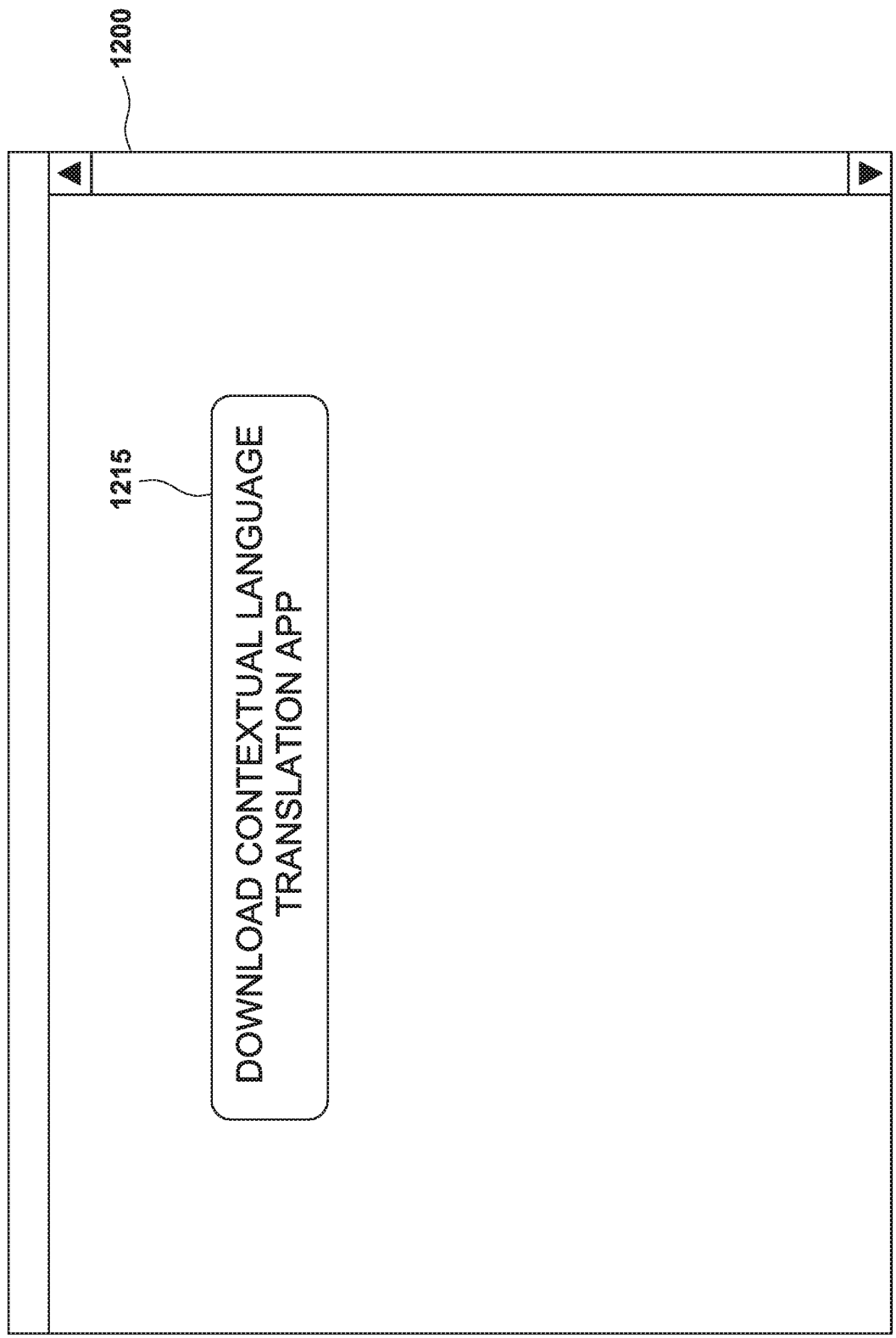
FIG. 12 shows a page that includes a button that causes a download of a contextual language translation application in accordance with an embodiment.

In one embodiment, from time to time, contextual language translation manager 835 may generate a page such as that shown in FIG. 12. Page 1200 includes a button 1215 labelled "DOWNLOAD CONTEXTUAL LANGUAGE TRANSLATION APP." Supposing that the third user selects button 1215, processor 880 downloads an appropriate version of CLT App 898 to user device 860. If the third user device has a previous "old" version of CLT App 898, processor 880 may download a more recent, updated version. The CLT App that is downloaded to a user device operates on the user device. The CLT App that operates on the user device may from time to time communicate with contextual language translation manager 835. For example, the CLT App operating on a user device may from time to time notify contextual language translation manager 835 that a user is composing a message and provide contextual language translation manager 835 access to the message in order to utilize certain functions of contextual language translation manager 835. The CLT App operating on a user device may also from time to time request and obtain an updated list of vocabulary words from contextual language translation manager 835.

In accordance with an embodiment, a user accesses email server 850, generates an email message, and sends the email message to a recipient. Contextual language translation manager 835-B (or the contextual language translation App residing on the user's user device) selectively translates one or more words in the email message from a first language to a second language. The partially-translated version of the email message is sent to the recipient.

Figure 13A:
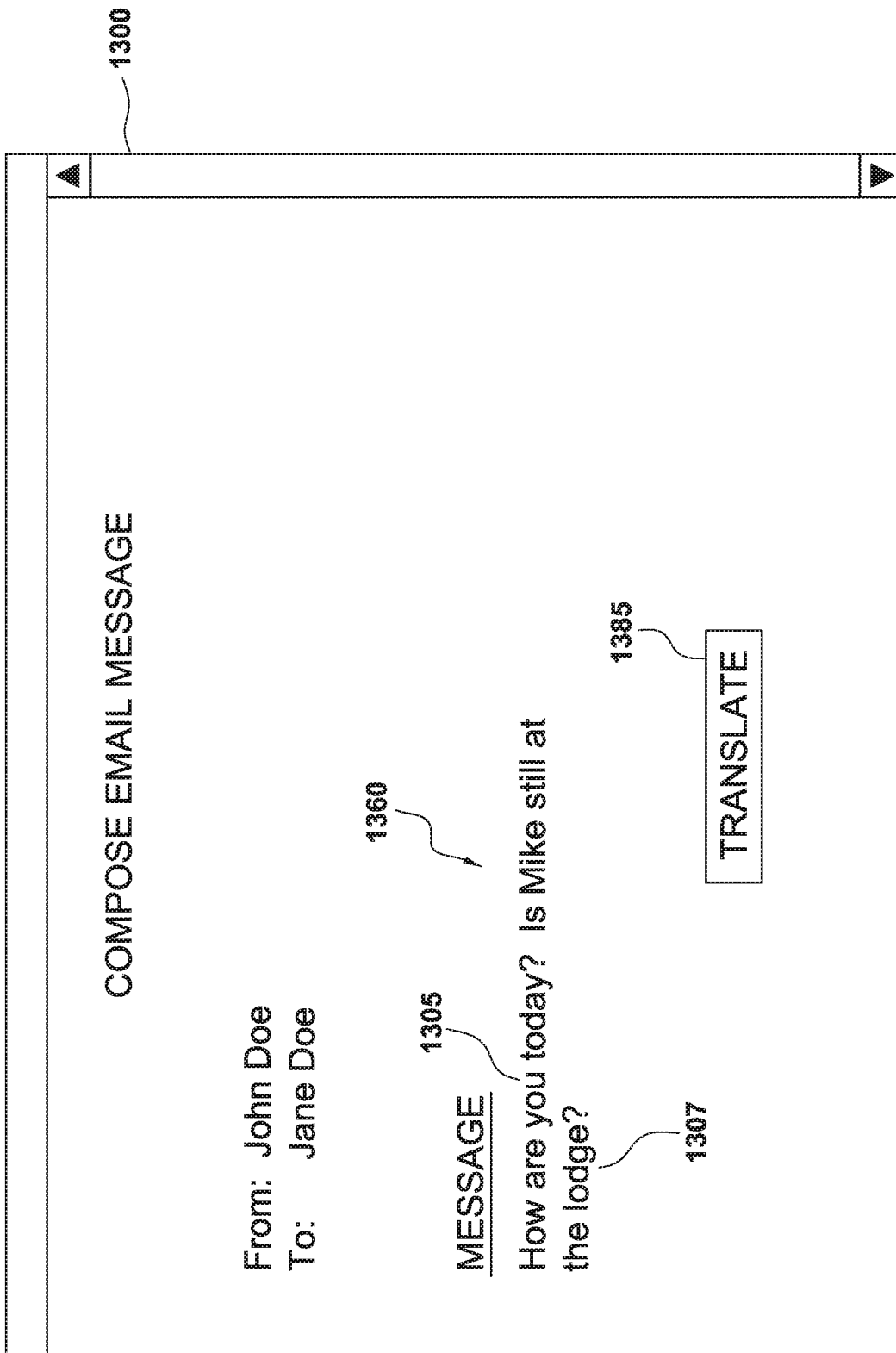
FIG. 13A shows a page on which a user may compose an email message in accordance with an embodiment.

Returning to the illustrative embodiment, the third user (John Doe), employing first user device 860, wishes to send an email message to a fourth user named "Jane Doe" who is employing second user device 875. The third user (John Doe) accordingly accesses email server 850 via network 805. Email server 850 generates a page such as that shown in FIG. 13A. FIG. 13A shows a page 1300 on which the third user (John Doe) may compose an email message in accordance with an embodiment. The third user (John Doe) therefore composes an email message. In the illustrative embodiment, the sender of the email message is specified to be "John Doe" and the recipient is "Jane Doe." The third user composes an email message 1360 in English. Specifically, the email message 1360 reads "How are you today? Is Mike still at the lodge?"

If the application is default "on" running in the background or default "off" after the third user composes the email message, the third user then selects a TRANSLATE button 1385 and/or then SEND, or the user selects an ENABLE (application) button before creating and sending the message 1385 located on page 1300. In response to the user's selection of TRANSLATE button 1385, or SEND or ENABLE (application), CLT App 862 (or contextual language translation manager 835-B residing on email server 850) examines email message 1360 and translates selected words into a second language. In the illustrative embodiment, CLT App 862 accesses the third user's language selections stored in User Data File 831 and determines that the third user's target language is Japanese, and that the third user selected the BASIC database, the SPORTS DATABASE, the BASKETBALL database, and the SKIING database. CLT App 862 therefore accesses translation tables 828 and compares the word lists associated with the BASIC database, SPORTS database, BASKETBALL database, and SKIING database to the email message. In the illustrative embodiment, CLT App 862 determines that the words "you" and the word "lodge" are present in one or more of the databases and thus are to be translated into Japanese.

Figure 13B:
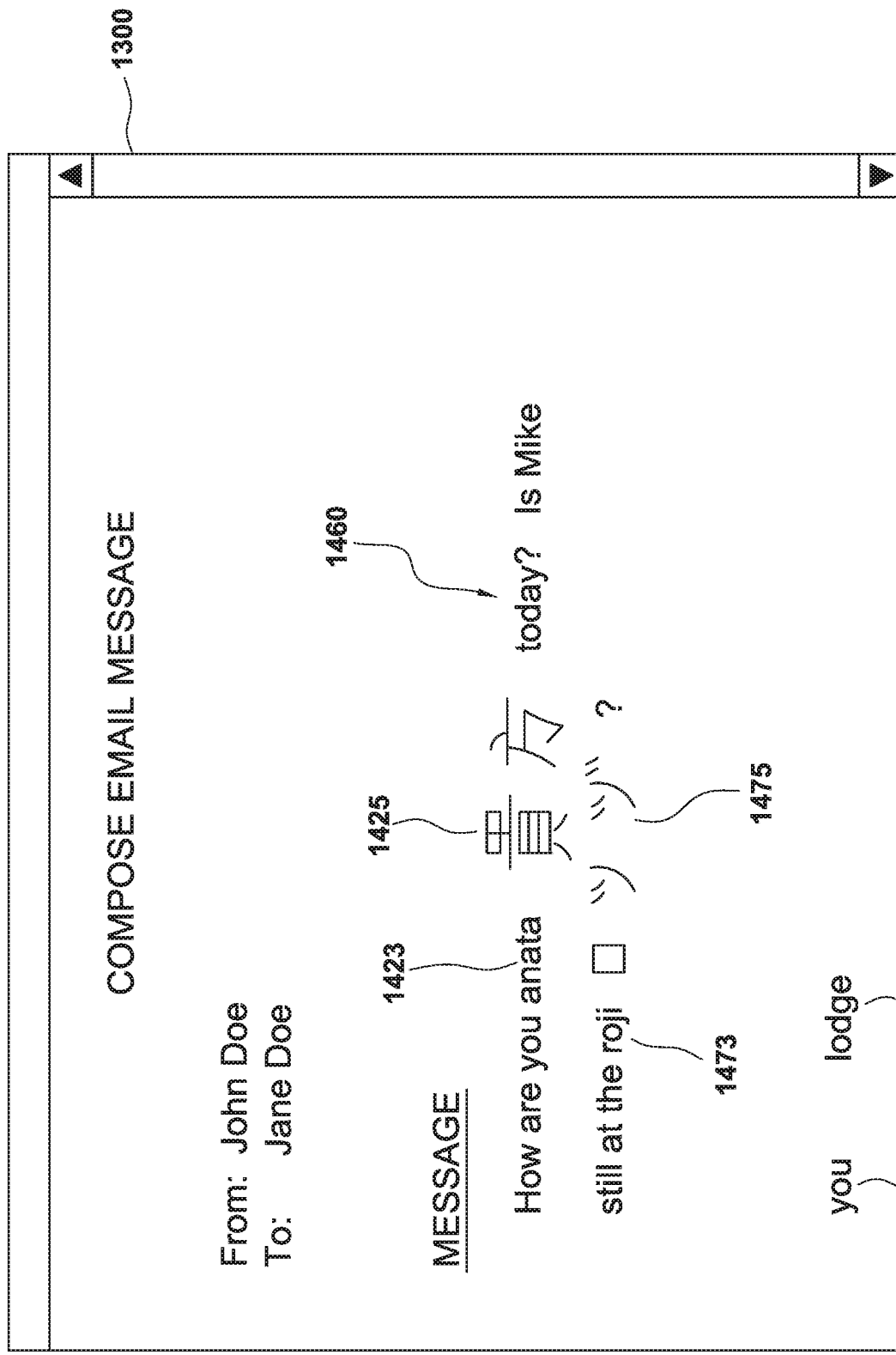
FIG. 13B shows a page displaying a partially-translated version of an email message in accordance with an embodiment.

Accordingly, CLT App 862 translates the selected words in message 1360 into the Japanese language. Specifically, CLT App 862 translates the word "you" (1305) and the word "lodge" (1307) into Japanese. CLT App 862 displays the partially-translated message on page 1300. FIG. 13B shows page 1300 and a partially-translated version 1460 of the third user's email message. Words in the email message that have not been translated are displayed in their original (English) form; however, the English words "you" (1305) and "lodge" (1307) in the message are translated into corresponding Japanese words along with the phonetic translation (according to the user's native language) of the Japanese word. In the illustrative embodiment, a first written version 1423 of the Japanese word for "you," transliterated into the Latin alphabet (as used by English speakers) is displayed, and a second written version 1425 of the Japanese word for "you" is displayed using Japanese characters. Similarly, a first written version 1473 of the Japanese word for "lodge," transliterated into the Latin alphabet (as used by English speakers) is displayed, and a second written version 1475 of the Japanese word for "lodge" is displayed using letters from the appropriate Japanese alphabet. The Japanese words are inserted into the message at appropriate locations. As shown in FIG. 13B, words in the first language that were replaced by translated versions are displayed in a selected location on the page. In the illustrative embodiment of FIG. 13B, the word "you" 1391 and the word "lodge" 1392 are displayed at the bottom of page 1300.

Figure 13C:
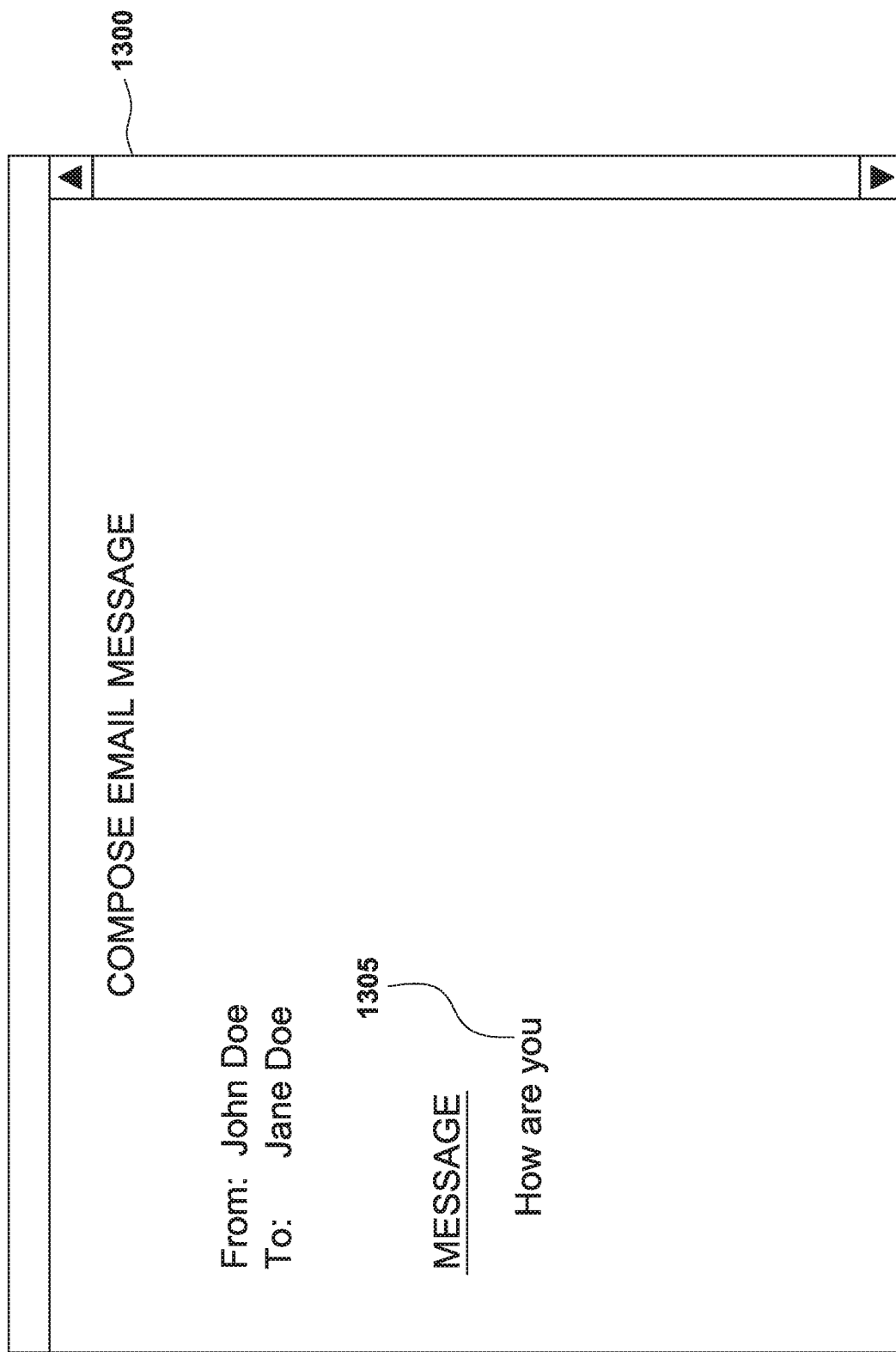
FIG. 13C shows a page on which a user may compose an email message in accordance with an embodiment.
Figure 13D:
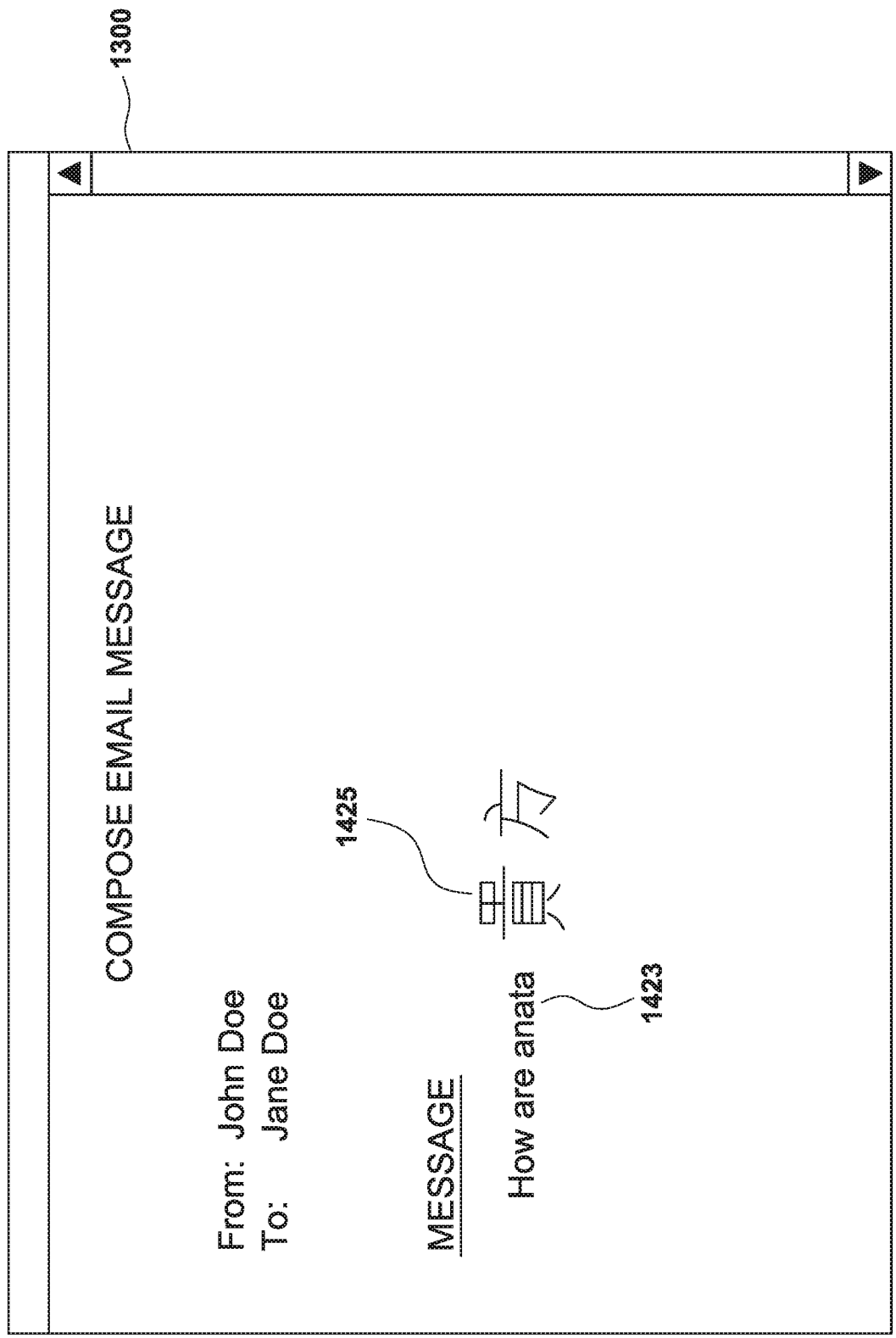
FIG. 13D shows a page displaying a partially-translated version of an email message in accordance with an embodiment.

In another embodiment, CLT App 862 (or contextual language translation manager 835-B in email server 850) examines, in real-time (or near real-time), each word as the word is typed by the third user on page 1300, and determines, immediately after the respective word is typed, whether or not the word is to be translated into the target language. For example, if the word is present in a relevant database, CLT App 862 translates the word immediately into the user's target language and displays the translation. Thus, as illustrated in FIG. 13C, after the third user types the word "you" (1305) in his message, CLT App 862 instantly determines that the "you" is present in a relevant database and translates the word into Japanese. The partially-translated version of the message is immediately displayed, as shown in FIG. 13D. The user may continue typing the message on the page with the partially-translated message.

After the email message is complete and has been (partially) translated, the partially-translated message 1460 is transmitted to the recipient's email account.

Figure 14:
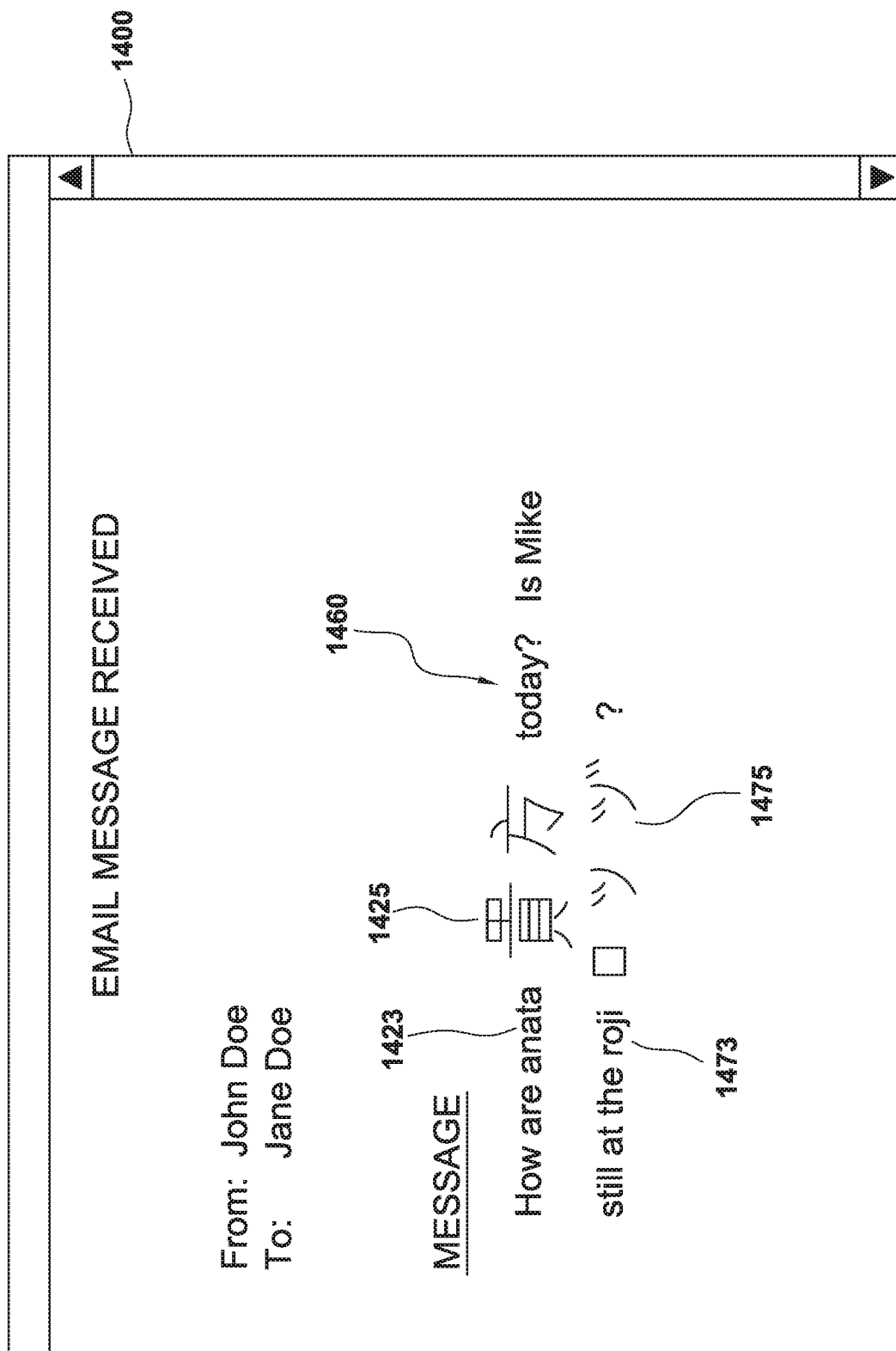
FIG. 14 shows a page on which a partially-translated email message is displayed in accordance with an embodiment.

When the fourth user (Jane Doe) employs user device 875 to access her email account and view the email message, the partially-translated version 1460 is displayed on user device 875. FIG. 14 shows a page 1400 on which the partially-translated email message 1460 is displayed in accordance with an embodiment. Supposing that the fourth user's email account is maintained at email server 850, when the fourth user views the email message, email server 850 (and/or contextual language translation manager 835-B) causes the partially-translated version of the message to be displayed on user device 875.

In accordance with another embodiment, a user may access a social media platform and post a message, an image, a video, or other data that is viewable by multiple persons. Facebook, Twitter, and Snapchat are well-known social media platforms available via the Internet. For example, a user may post to a Facebook page a message that may then be viewed by authorized individuals (e.g., the user's "friends"), or the user may post, via Twitter, a message that is viewable by multiple persons who "follow" the user.

In accordance with an embodiment, selected words in a message posted on a social media platform are translated from a first language to a second language, and the partially-translated version of the message is displayed on the social media platform. Other users of the social media platform who view the message perceive the partially-translated version of the message.

In an illustrative embodiment, a fifth user associated with the identifier "@JohnSmith3377" employs user device 860 to access contextual language translation manager 835 and select a social media platform. Suppose, for example, the fifth user wishes to post messages via Twitter; however, the fifth user wishes to have each message partially-translated into Japanese before being posted, and wishes that the partially-translated version of each message be posted on Twitter.

Figure 15:
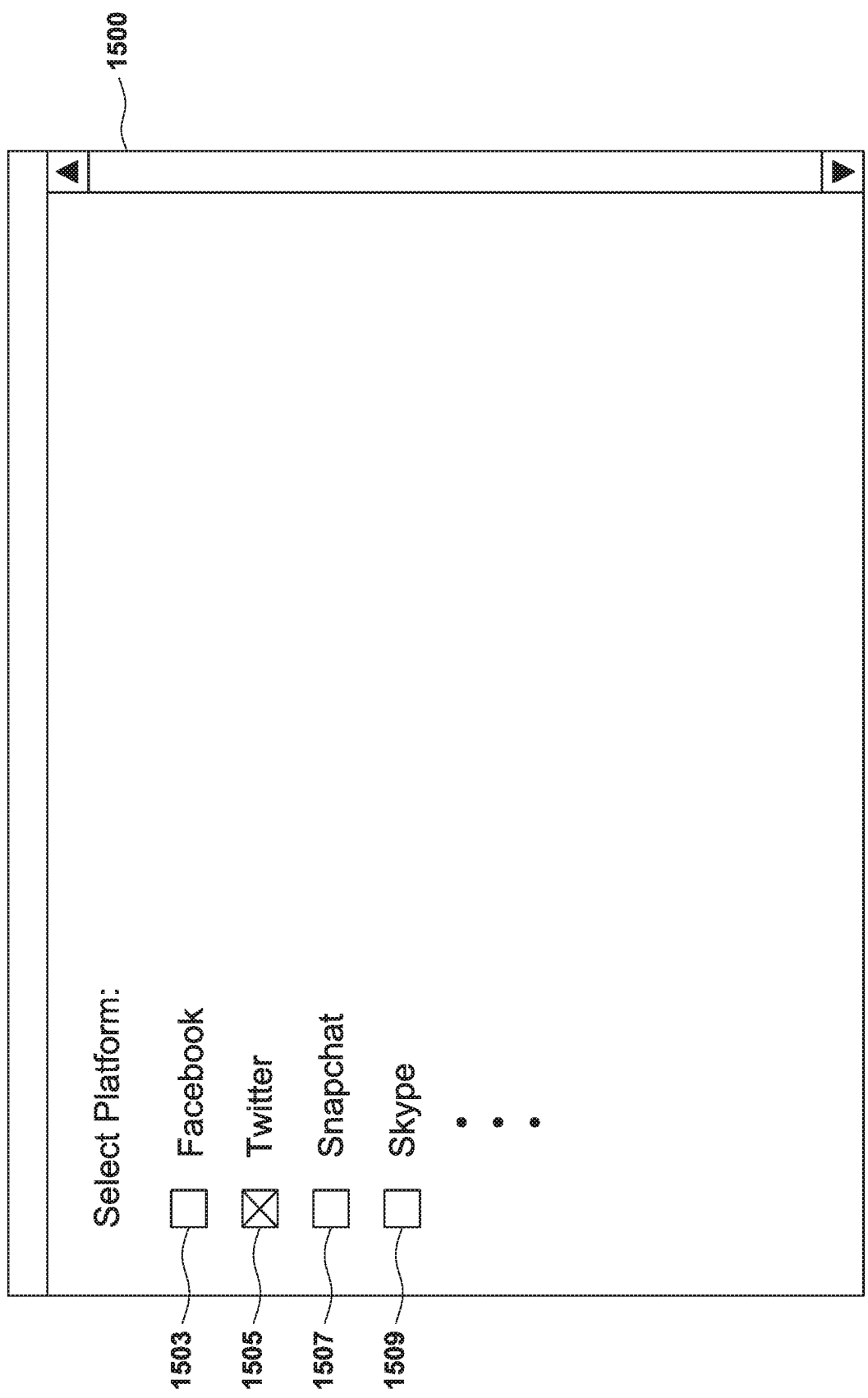
FIG. 15 shows a page that includes a list of social media platforms in accordance with an embodiment.

In the illustrative embodiment the fifth user employs user device 860 to access contextual language translation manager 835. Contextual language translation manager 835 generates a page such as that shown in FIG. 15. Page 1500 includes a list of widely-used social media platforms including Facebook (1503), Twitter (1505), Snapchat (1507), Skype (1509), etc. Other social media platforms may be included. In the illustrative embodiment, the fifth user selects Twitter (1505). The fifth user may select other social media platforms, as well. In the illustrative embodiment, the fifth user selects social media platform 845 (shown in FIG. 8A, 8B, 8D). The fifth user's selections are stored in a User-2 Data file 892 in storage 884 (shown in FIG. 8C). User device 860 may store the user's selections in User Data File 831.

After the fifth user selects one or more social media platforms, contextual language translation manager 835 may download an updated version of CLT App 862 to user device 860. The updated version may be adapted to interface with social media platform 845, for example.

FIG. 16 is a flowchart of a method in accordance with an embodiment. At step 1610, a text message posted by a user on a social media platform is intercepted (or received) message comprising a plurality of words in a first language, before the message is displayed on the social media platform. At step 1620, one or more words among the plurality of words are selected, based on one or more predetermined criteria. At step 1630, the one or more selected words are translated from the first language to the second language. At step 1640, the text message is caused to be posted on the social media platform, wherein words that are in the plurality of words and are not among the one or more selected words are posted in the first language and words that are in the plurality of words and are among the one or more selected words are posted in the second language. At step 1650, a second user device is caused to display a prompt to download software adapted to translate the text message into a third language. At step 1660, a request to download the software is received from the second user device. At step 1670, the software is downloaded to the second user device, in response to the request.

Figure 17A:
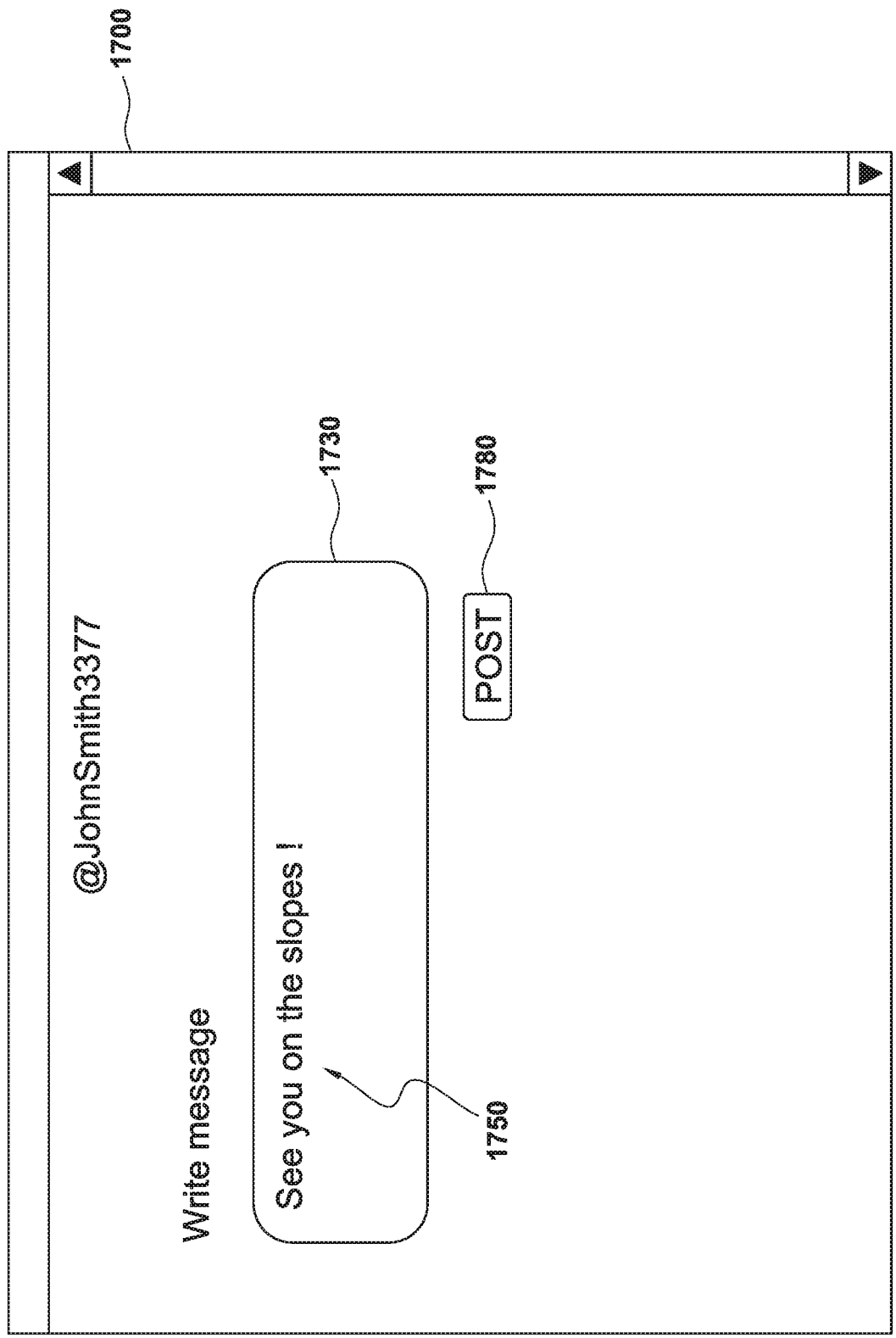
FIG. 17A shows a page associated with a social media platform, and includes a field in which a user may compose a message in accordance with an embodiment.

Returning to the illustrative embodiment, the fifth user now accesses social media platform 845 and composes a message for posting to the social media platform. FIG. 17A shows a page 1700 associated with social media platform 845. Page 1700 includes a field 1730 in which a message may be composed. The fifth user composes a message 1750 which reads "See you on the slopes!" The fifth user then selects a POST button 1780 to post message 1750 on social media platform 845.

Figure 17B:
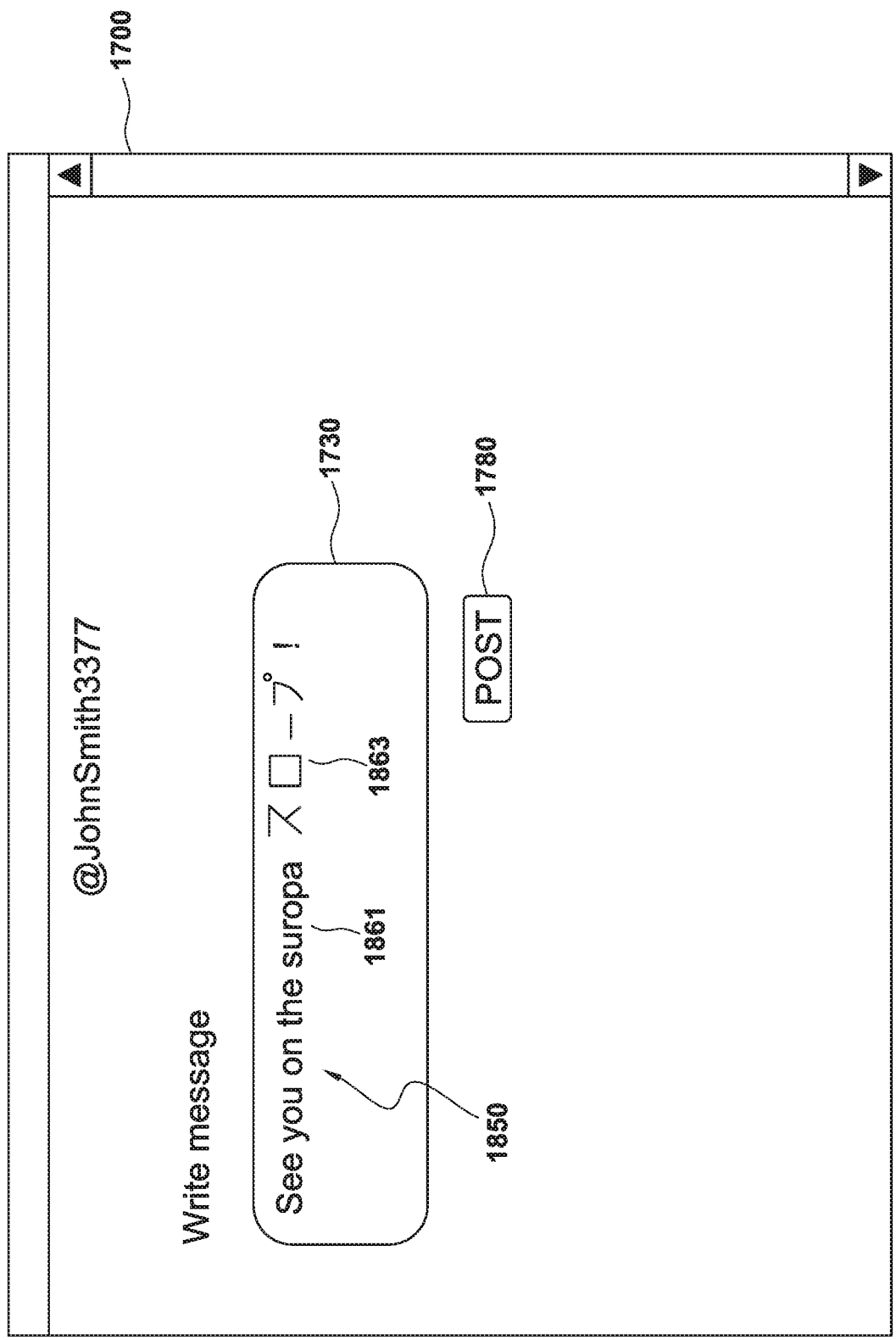
FIG. 17B shows a page associated with a social media platform, and includes a field displaying a partially-translated message in accordance with an embodiment.

In one embodiment, CLT App 862 (in user device 860) (or contextual language translation manager 835-A within social media platform 845) intercepts or receives message 1750 after the message is generated and before it is posted on social media platform 845. CLT App 862 performs a selective translation function with respect to message 1750 in a manner similar to that described above. Specifically, CLT App 862 accesses the fifth user's selected databases and determines that the word "slopes" is present in a relevant database. CLT App 862 thus translates the English word "slopes" to the corresponding Japanese word. For example, CLT App 862 may examine translation tables 828 and identify a Japanese word that corresponds to the English word "slopes." Referring to FIG. 17B, a partially-translated version 1850 of message 1750 is displayed on page 1700. In partially-translated message 1850, a transliterated version 1861 of the Japanese word is displayed, and a translated version 1863 of the Japanese word, written using an appropriate alphabet of the Japanese writing system, is also displayed.

When the fifth user wishes to post the partially-translated message 1850, the fifth user may select a "POST" button 1780. When the POST button 1780 is selected, CLT App 862 posts the partially translated message 1850.

Suppose now that a sixth user associated with the identifier "BillJones6655" employs user device 875 to access social media platform 845. Suppose further that the sixth user is among the persons who are authorized to view the messages posted by the fifth user associated with the identifier "@JohnSmith3377." Contextual language translation manager 835-A (within social media platform 845) may thus generate, and cause user device 875 to display, a page containing partially-translated message 1850, as shown in FIG. 18.

Figure 18:
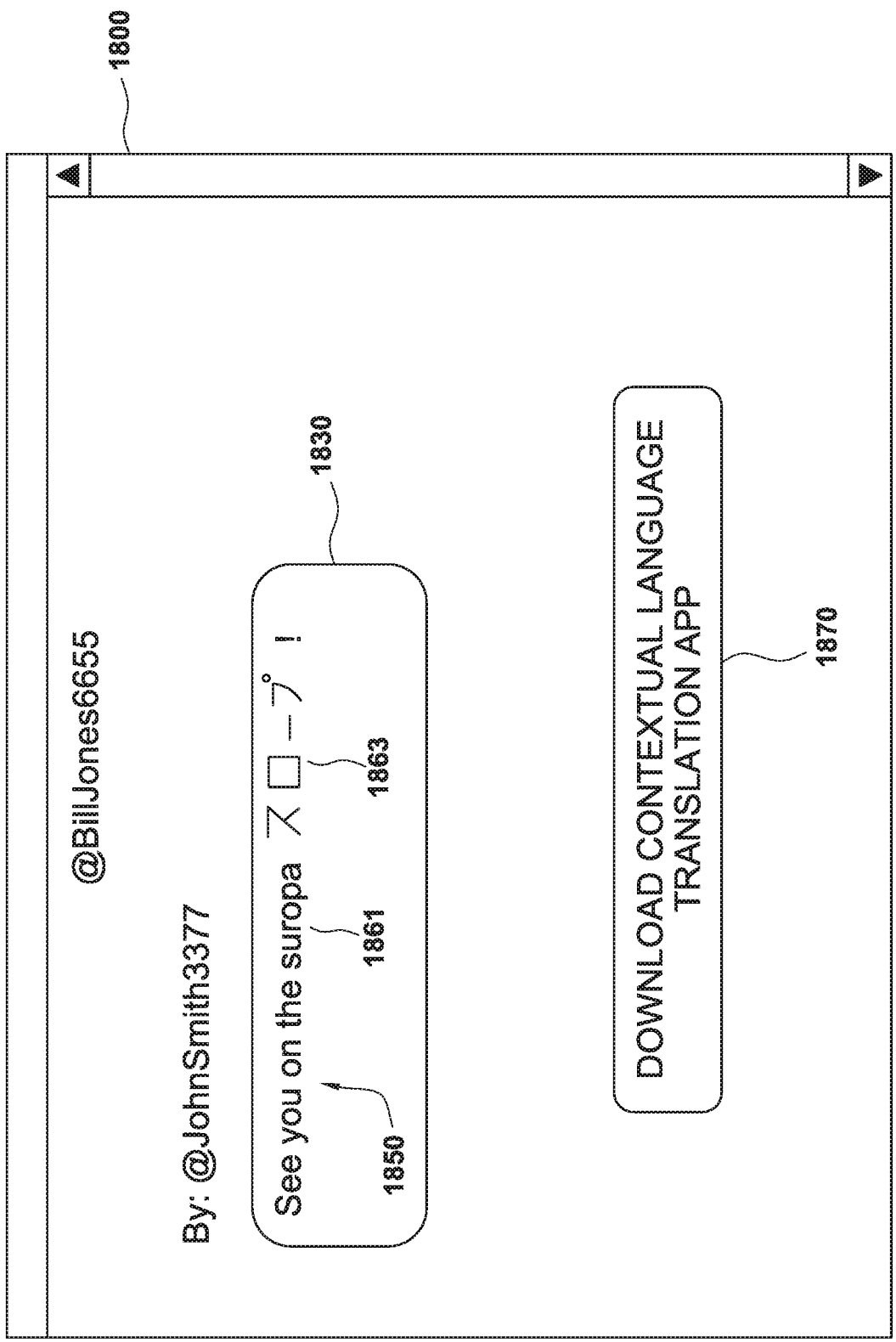
FIG. 18 shows a page associated with a social media platform, including a field showing a partially-translated message posted by a user, in accordance with an embodiment.

FIG. 18 shows a page displaying a message posted on a social media platform in accordance with an embodiment. Page 1800 includes a field 1830 showing partially-translated message 1850 posted by the fifth user (associated with the identifier @JohnSmith3377). In version 1850 of the message, the English word "slopes" has been translated to the corresponding Japanese word, including the first written version 1861 of the Japanese word, transliterated into the Latin alphabet, and the second written version 1863 of the Japanese word, written using an appropriate Japanese alphabet.

Suppose further that the sixth user (who is associated with the identifier @BillJones6655) views the partially-translated message 1850 on page 1800, and decides that he also wishes to obtain the contextual language translation system. For example, he may wish to translate the message into a third language. To enable other users to obtain and use the contextual language translation system, processor 880 of contextual language translation manager 835 causes a button 1870 labelled "DOWNLOAD CONTEXTUAL LANGUAGE TRANSLATION APP" to be displayed on page 1800. Thus, when the sixth user (associated with the identifier @BillJones6655) selects button 1870, processor 880 downloads a version of CLT App 898 onto user device 875. The CLT App is stored on user device 875 as CLT App 877, as shown in FIG. 8B.

Suppose that the sixth user (associated with the identifier @BillJones6655), wishing to use the contextual language translation functions provided by CLT App 877, now uses CLT App 877 (or contextual language translation manager 835) to specify his native language as SPANISH and his target language as ENGLISH.

Figure 19:
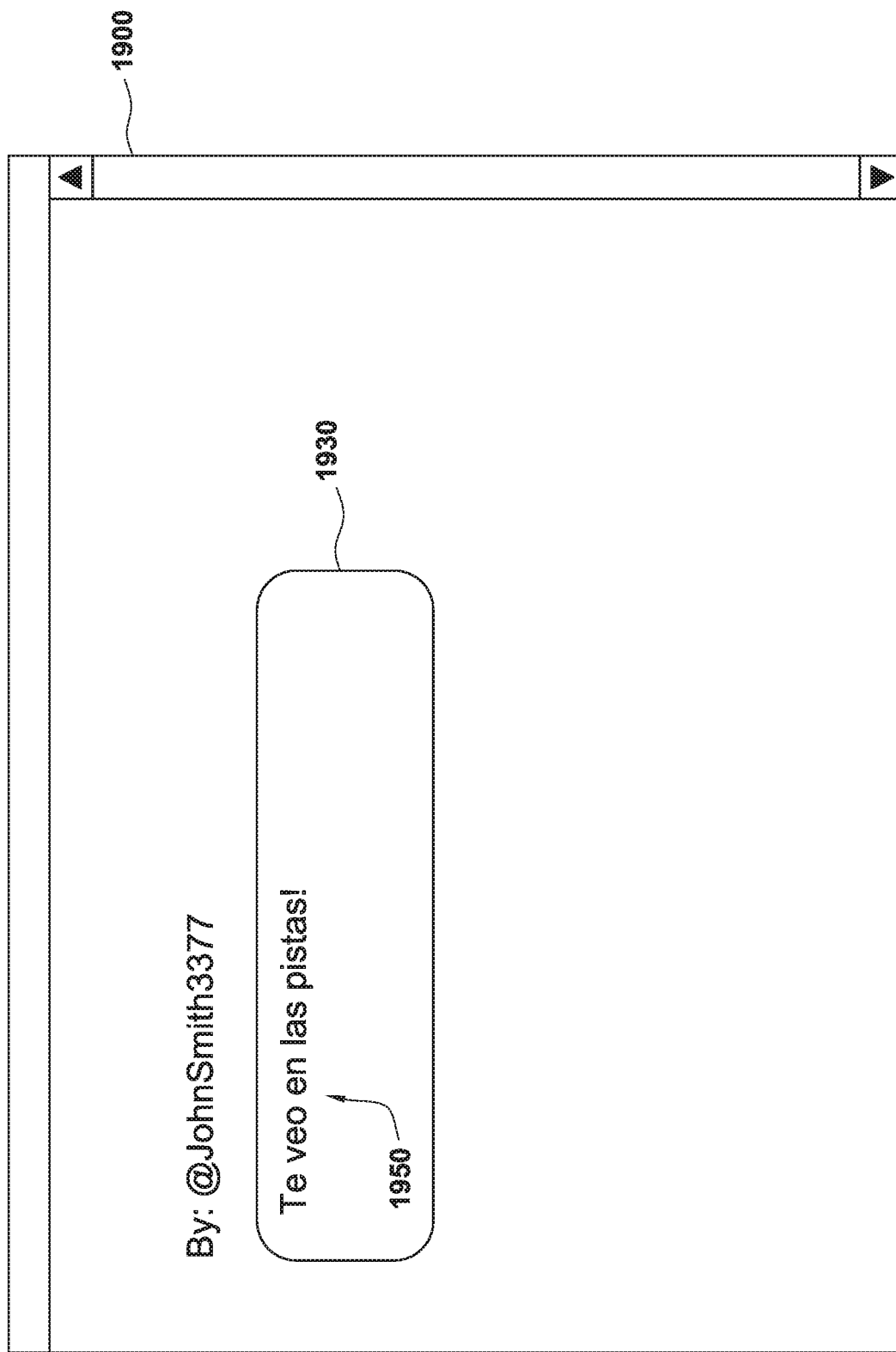
FIG. 19 shows a page associated with a social media platform, including a field showing a message posted by a user, in accordance with an embodiment.

The sixth user, employing user device 875, may now view messages posted on social media platform 845 in accordance with his preferred language selections. CLT App 877 may generate other versions of partially-translated message 1850 based on the sixth user's language selections. For example, in one illustrative embodiment shown in FIG. 19, CLT App 877 (on user device 875) may translate message 1850 and generate a Spanish version of the message. FIG. 19 shows a page 1900 including a field 1930 that contains a Spanish-language version 1950 of the message 1850 (originally posted by the first user associated with the identifier @JohnSmith3377).

Figure 20:
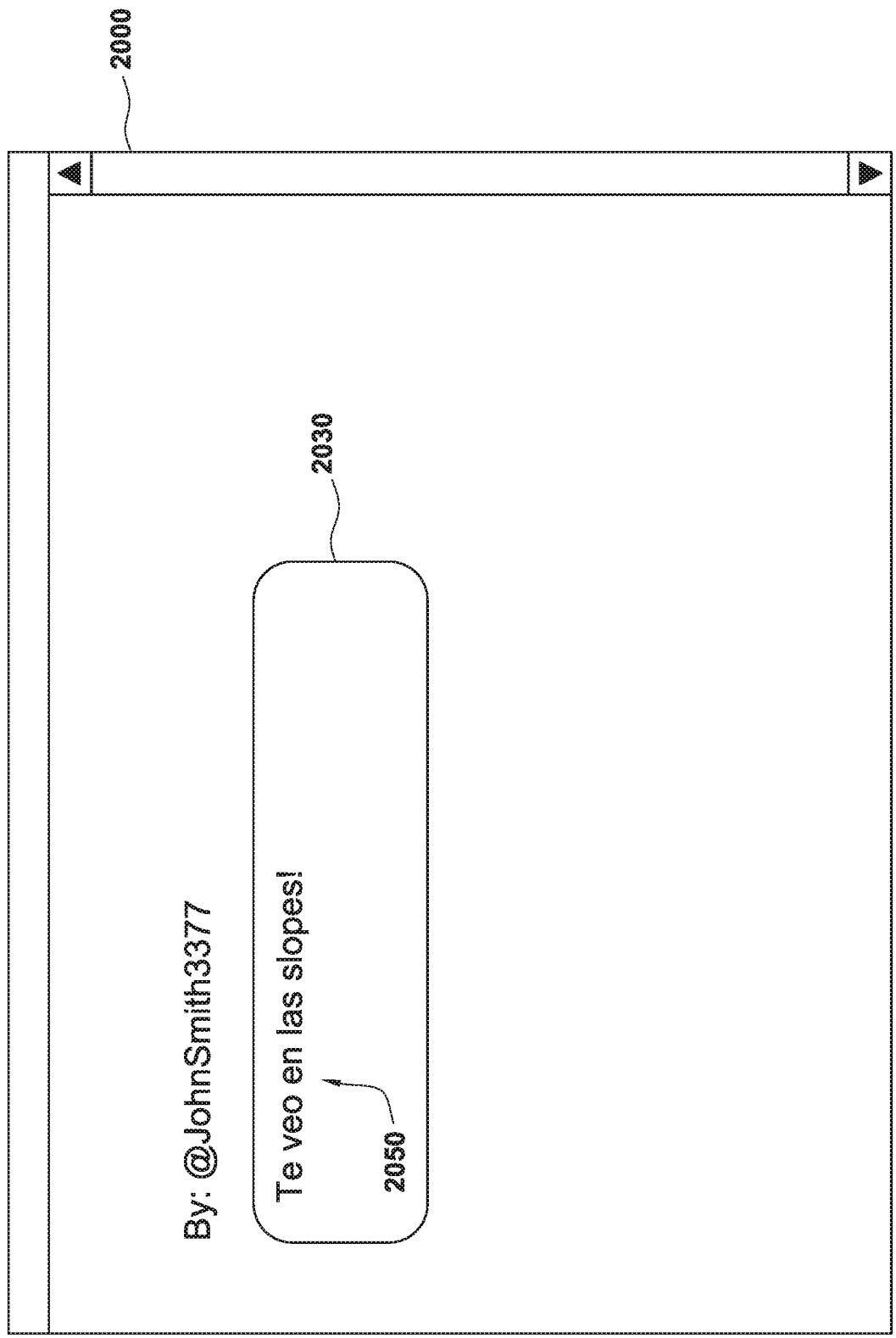
FIG. 20 shows a page associated with a social media platform, including a field showing a message posted by a user, in accordance with an embodiment.

In another illustrative embodiment shown in FIG. 20, CLT App 877 (on user device 875) may translate message 1850 and generate a Spanish/English version of the message. FIG. 20 shows a page 2000 including a field 2030 that contains a partially-translated version 2050 of message 1850 in which English words are translated into Spanish, and Japanese words are translated into English.

Figure 21:
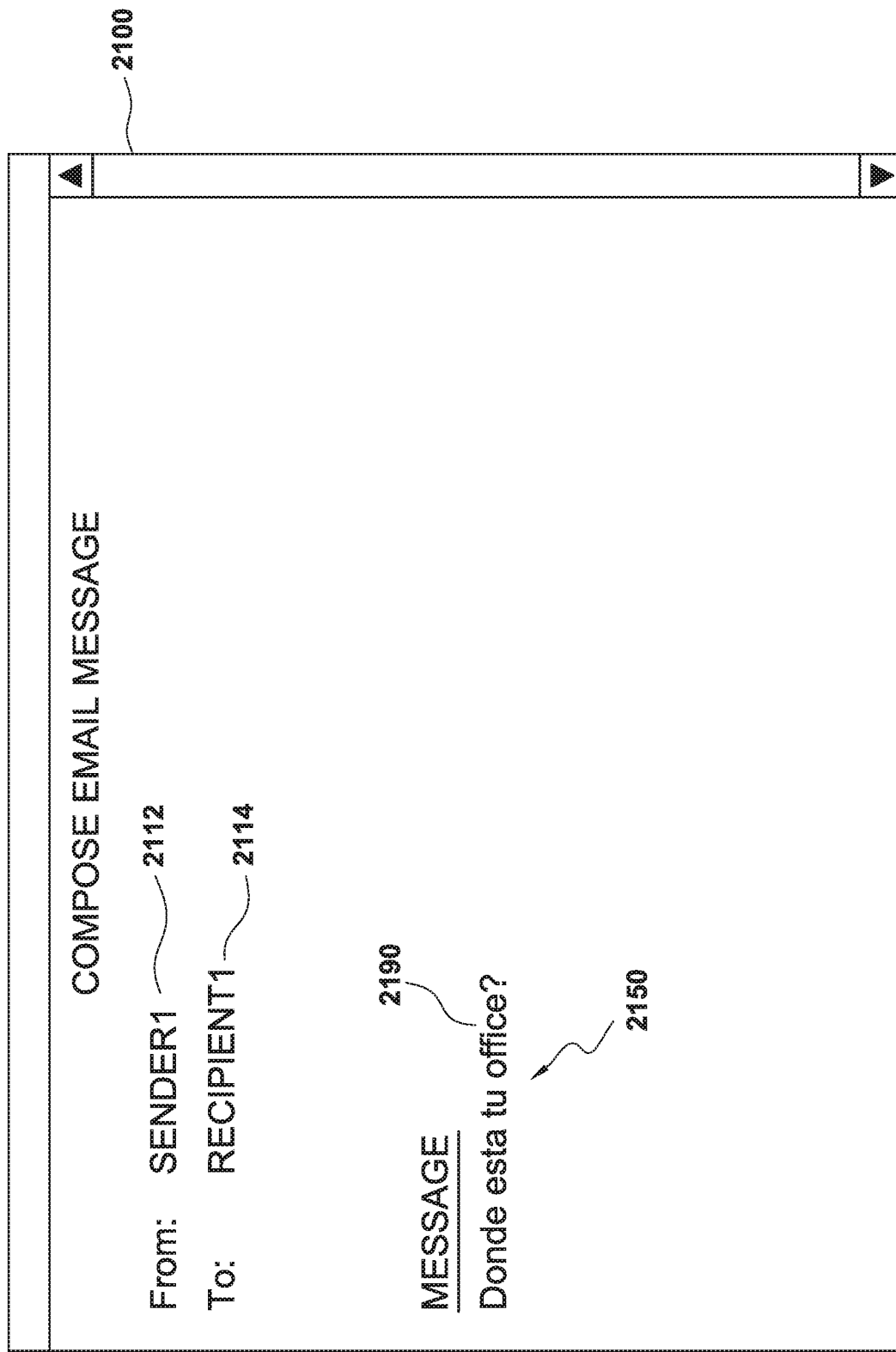
FIG. 21 shows a page on which a user may compose an email message in accordance with an embodiment.

In another embodiment, when a user types a message in a specified target language, but types one word of the message in his or her specified native language, the word typed in the native language is translated into the target language to be consistent with the remainder of the message. FIG. 21 shows a page 2100 on which a user may compose an email message. In the illustrative embodiment, the user has specified her native language to be English and her target language to be Spanish.

Page 2100 includes a sender field 2112 and a recipient field 2114. The user has typed a message 2150. The user, wishing to practice her Spanish language skills, has typed the first three words of the message ("Donde esta to") in Spanish. However, the user, not knowing the Spanish word for "office," has typed the last word of the message ("office") in English.

Figure 22:
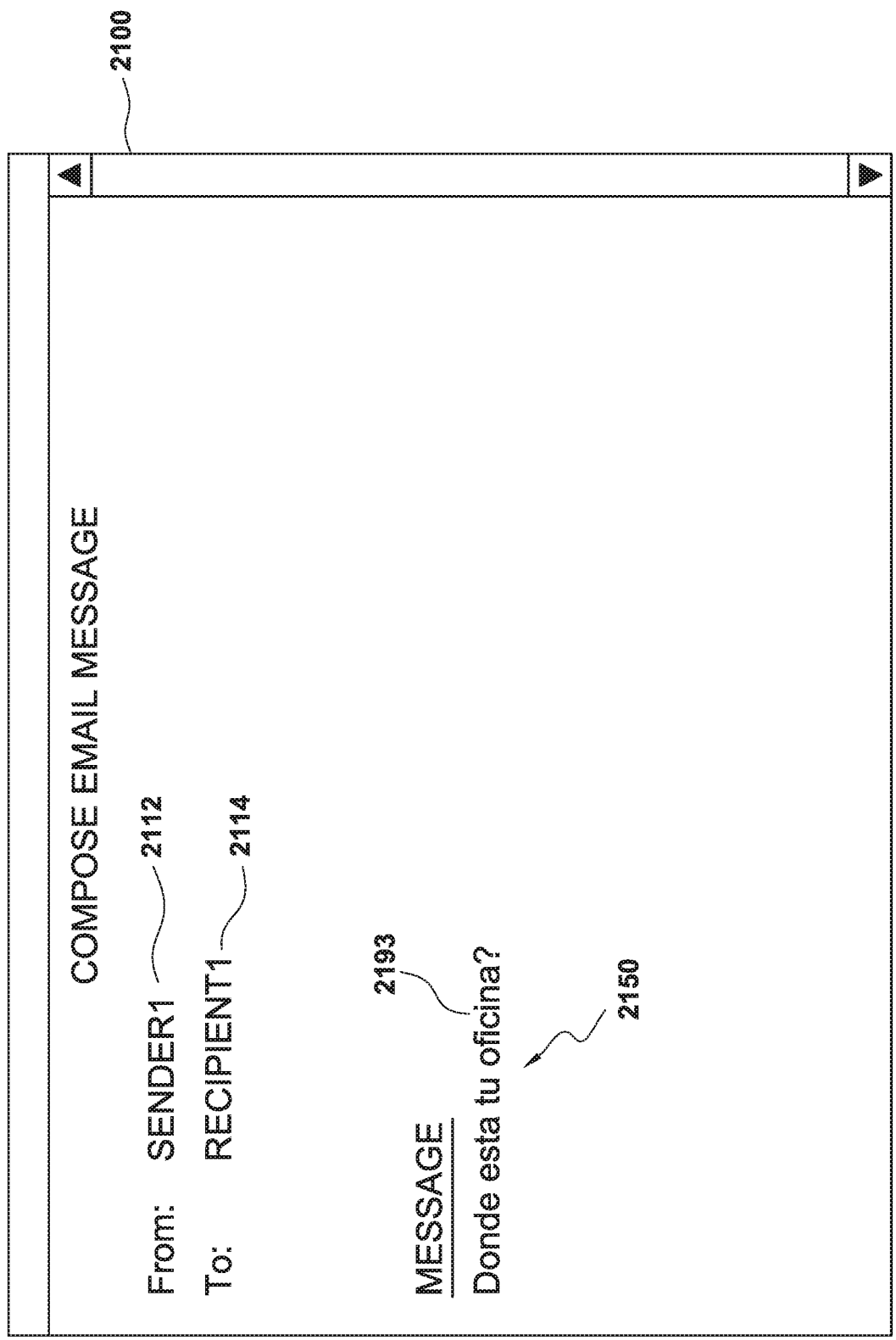
FIG. 22 shows a page displaying a partially-translated email message in accordance with an embodiment.

In the illustrative embodiment, the user is employing user device 860. CLT App 862 examines message 2150 and determines that the first three words are in the user's target language, but that the last word is in the user's native or chosen base language. CLT App 862 accordingly translates the last word into the user's target language (Spanish) and displays the entire message in the target language. FIG. 22 shows page 2100 in which message 2150 is displayed entirely in the user's target language. The last word of the message has been translated, and a Spanish version 2193 of the word is displayed.

Figure 23:
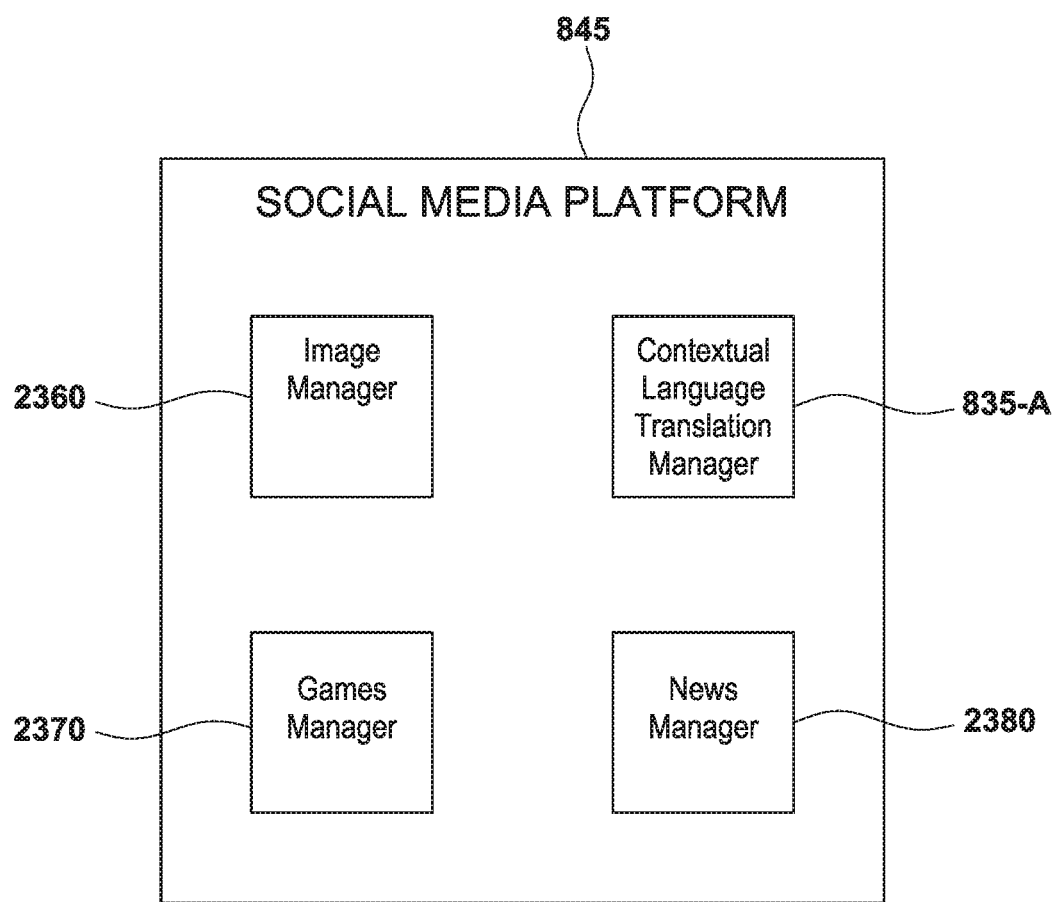
FIG. 23 shows components of a social media platform in accordance with an embodiment.

FIG. 23 shows components of social media platform 845 in accordance with an embodiment. Social media platform 845 includes contextual language translation manager 835-A, an image manager 2360, a games manager 2370, and a news manager 2380. Image manager 2360 enables users to post and manipulate images on the social media platform. Games manager 2370 enables users to play Contextual Language Translation games and puzzles on the social media platform. News manager 2380 obtains news articles from various sources and posts them on social media platform 845. Contextual language translation manager 835-A applies contextual language translation functions to images posted on social media platform 845, games available on social media platform 845, and news posted on social media platform 845.

Figure 24A:
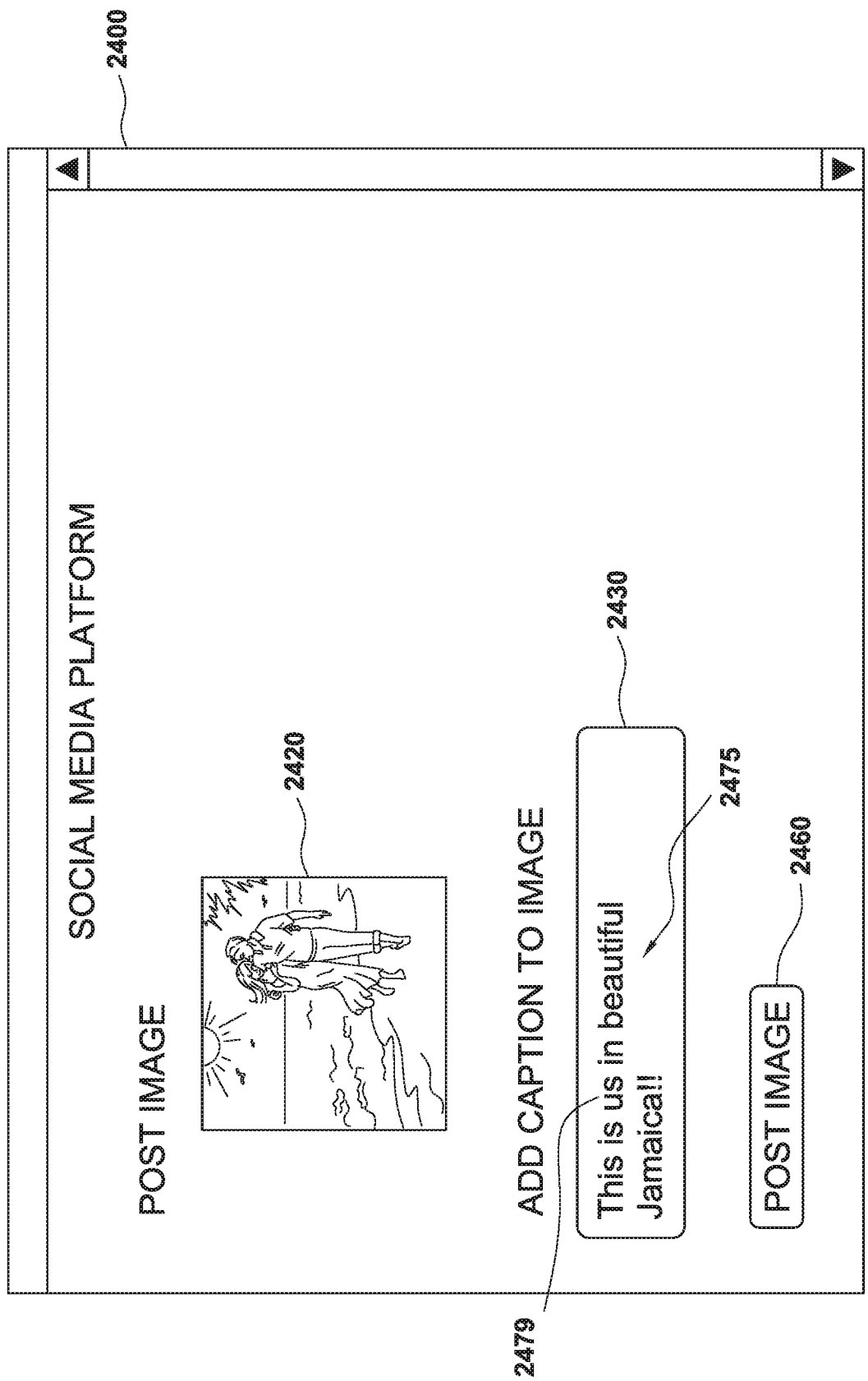
FIG. 24A shows a page on which a user may upload and post an image in accordance with an embodiment.

FIG. 24A shows a page of social media platform 845 on which a user may upload and post an image. In the illustrative embodiment, a user has uploaded an image 2420. Page 2400 also includes a field 2430 in which a user may enter a caption for the image. The user has entered a caption 2475, "This is us in beautiful Jamaica!"

Figure 24B:
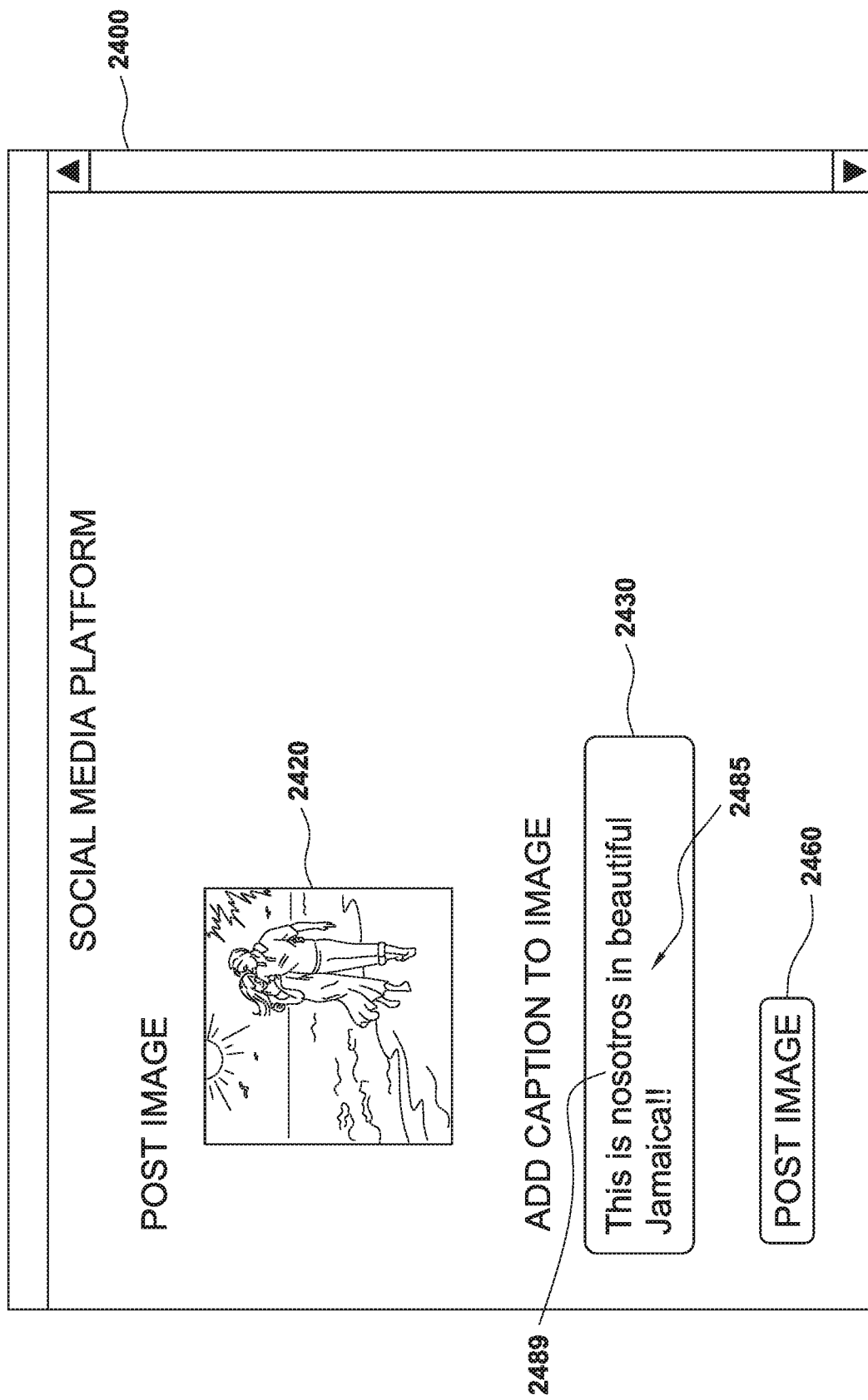
FIG. 24B shows a page on which a user may upload and post an image in accordance with an embodiment.

In the illustrative embodiment of FIG. 23, contextual language translation manager 835-A determines that the user's native language is English and the user's target language is Spanish. Contextual language translation manager 835-A thus examines caption 2475 and determines that the word "us" (2479) is present in a relevant database, and therefore is to be translated into Spanish. Contextual language translation manager 835-A accordingly translates the word "us" (2479) into a corresponding Spanish word. FIG. 24B shows page 2400 in which a partially-translated caption 2485 is displayed in field 2430. Partially-translated caption 2485 includes a Spanish word "nosotros" (2489) in place of the English word "us." When the user wishes to post the image and the caption, the user may select a POST IMAGE button 2460. Image manager 2360 of social media platform 845 combines image 2420 and partially-translated caption 2485, and posts the combined image.

Figure 24C:
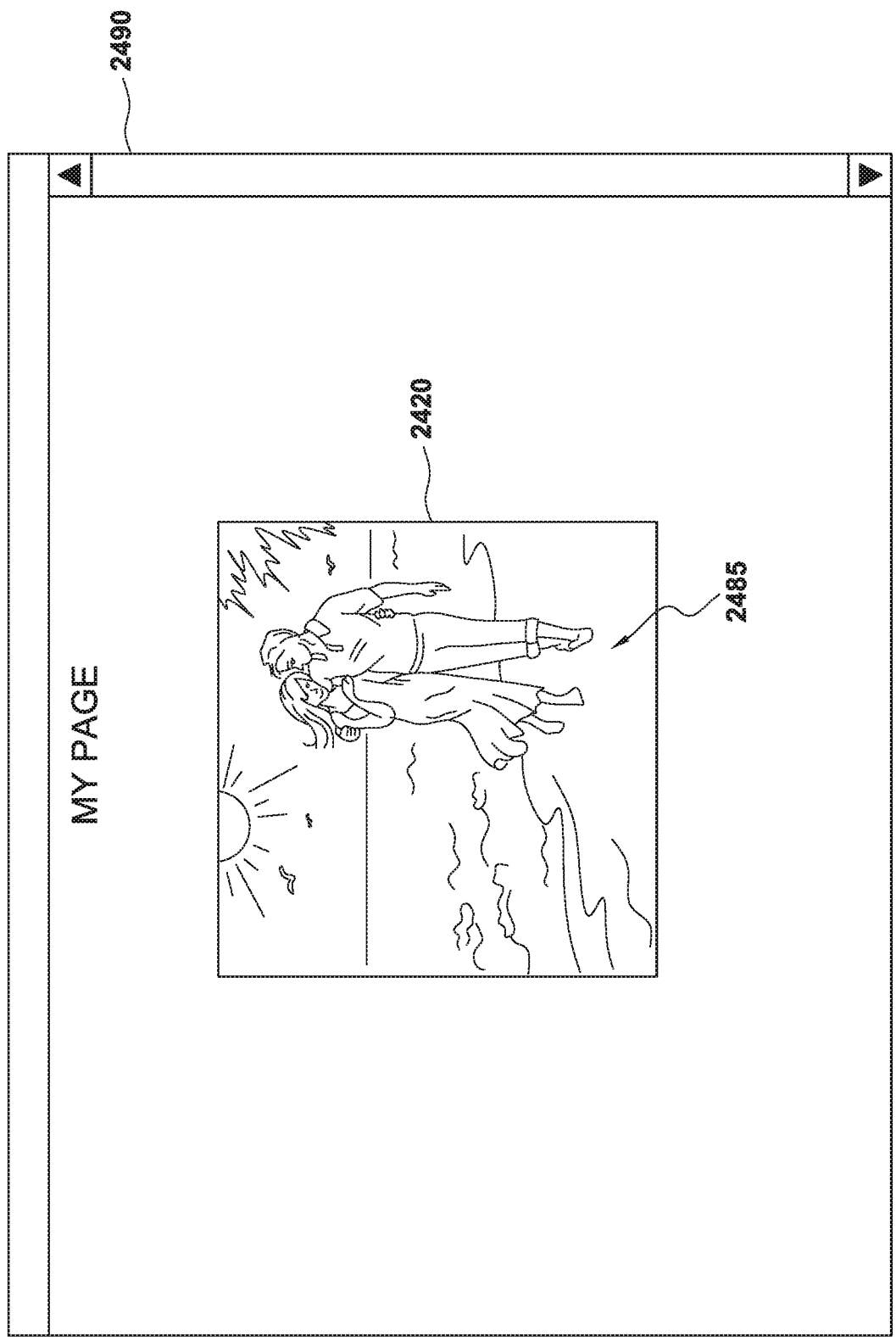
FIG. 24C shows a page, associated with a social media platform, that includes an image posted by a user in accordance with an embodiment.

FIG. 24C shows a page 2490 on which the combined image is displayed. Image 2420 now includes partially translated caption 2485.

In another embodiment, contextual language translation functions may be applied to generate a meme containing an image and text in a manner similar to that described with reference to FIGS. 24A-24C.

Figure 25:
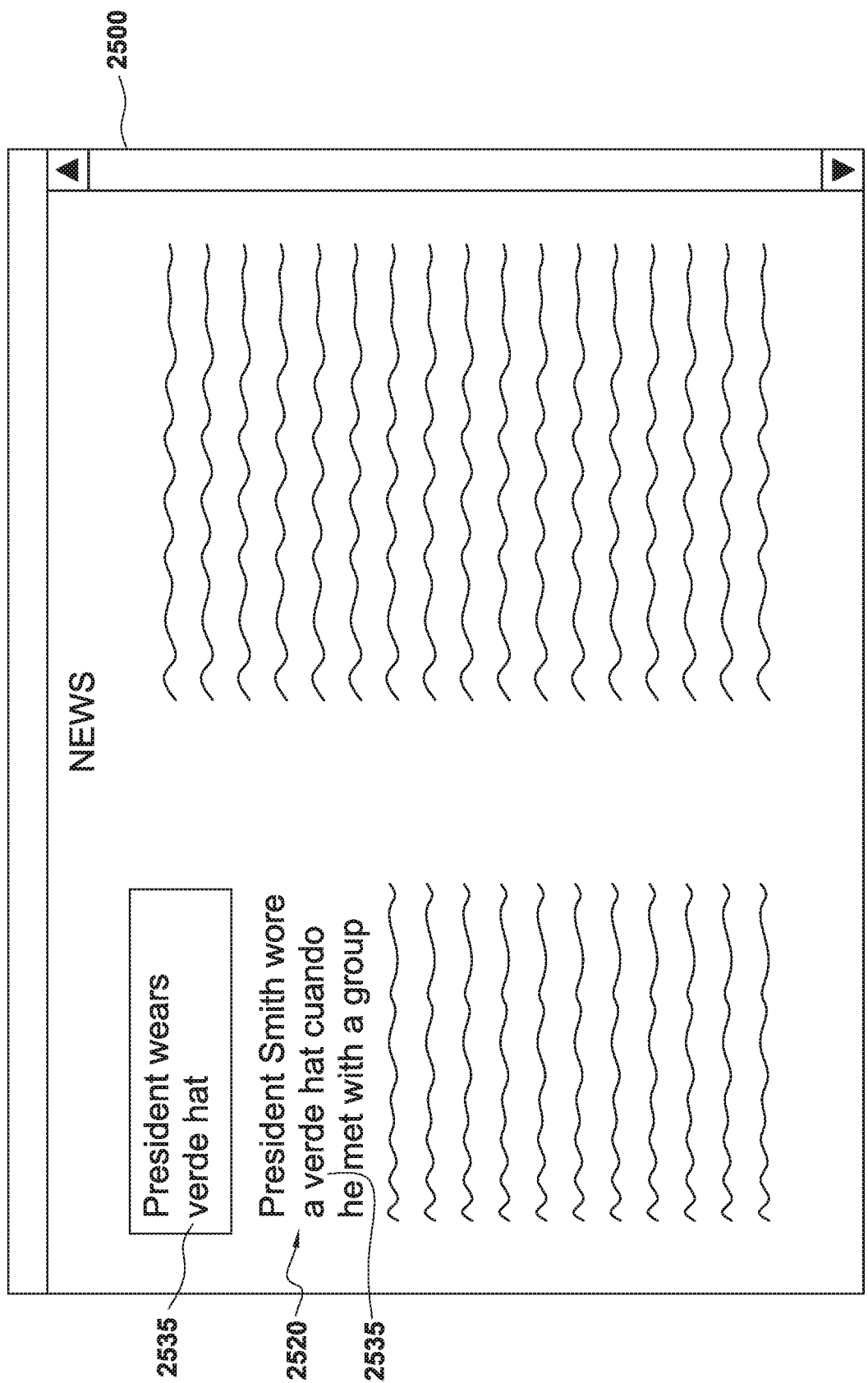
FIG. 25 shows a page displaying a partially-translated news article in accordance with an embodiment.

In accordance with another embodiment, a news article is obtained by a social media platform 845 from a news source. Selected words in the news article are translated from a first language to a second language, and a partially-translated version of the news article is posted on the social media platform. For example, news manager 2380 may obtain a news article from a news feed available via the Internet. Contextual language translation manager 835-A selects one or more words in the text of the article, based on one or more criteria, and translates them from a first language to a second language. For example, words may be selected based on the database selections of a particular user, the selected words may be translated into the user's target language, and the partially-translated version of the news article is posted on the user's page. FIG. 25 shows a page 2500 displaying a partially-translated version 2520 of a news article. The article is predominantly in English, but selected words (including "verde" 2535) are written in Spanish. The translation of a news article may be determined by a user's selections of native language and target language, vocabulary databases, etc.

Figure 26:
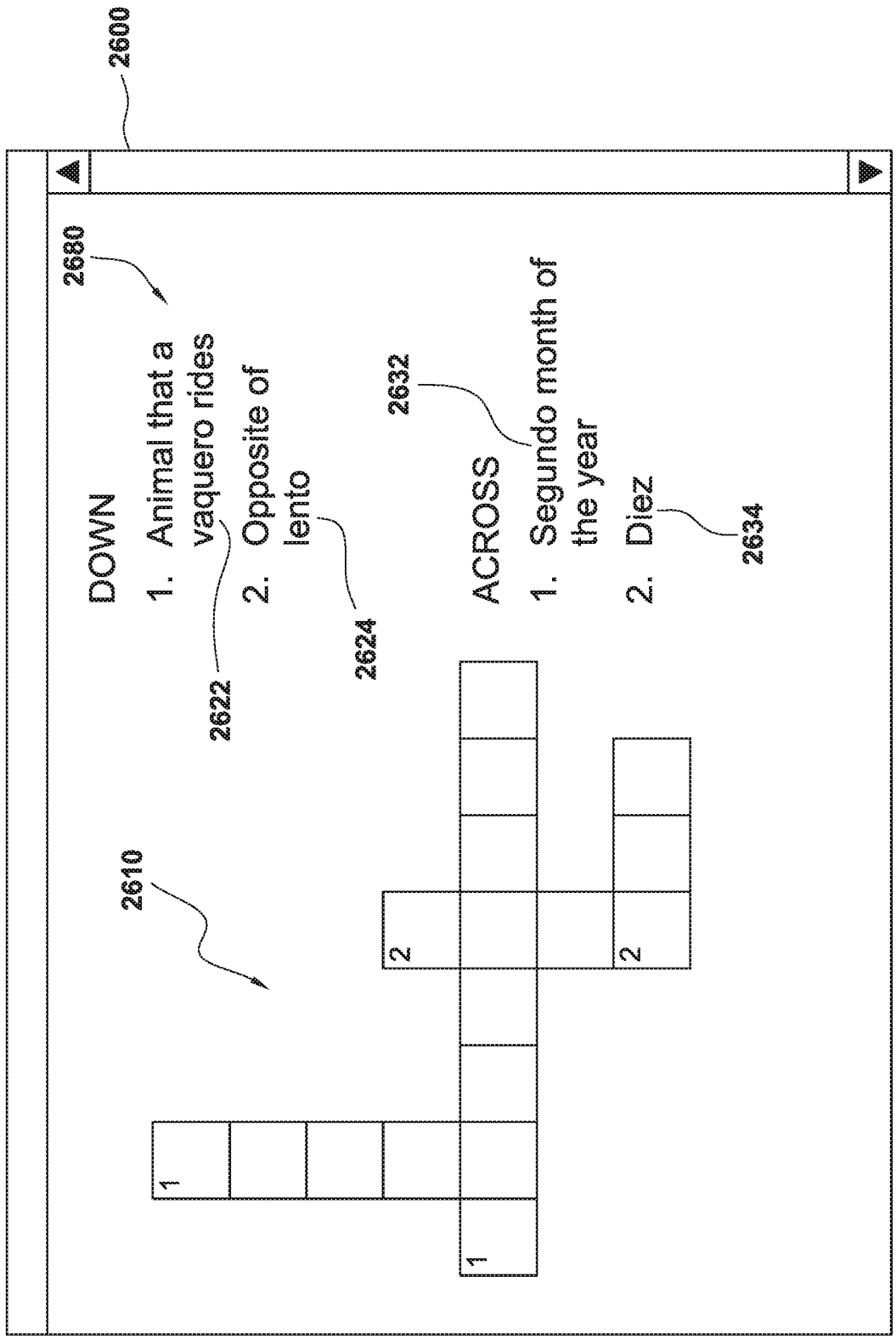
FIG. 26 shows a page containing a crossword puzzle game in accordance with an embodiment.

In another embodiment, social media platform provides a game to users. Text associated with the game is examined and selected words in the text is translated from a first language to a second language. For example, social media platform 845 may provide a crossword puzzle game to users. If a user selects a crossword puzzle option (not shown), games manager 2370 may generate a page such as that shown in FIG. 26. FIG. 26 shows a page 2600 containing a crossword puzzle that may be played by a user of social media platform 845. A crossword puzzle 2610 is displayed on the left side of page 2620. Clues 2680 to the crossword puzzle are displayed on the right side of page 2600. Contextual language translation manager 835-A may examine the clues and translate selected words in the clues from a first language to a second language. In the illustrative embodiment of FIG. 26, the clues 2680 are written predominantly in English. However, selected words of clues 2680, including words 2622, 2624, 2632, and 2634, are written in Spanish.

Figure 27:
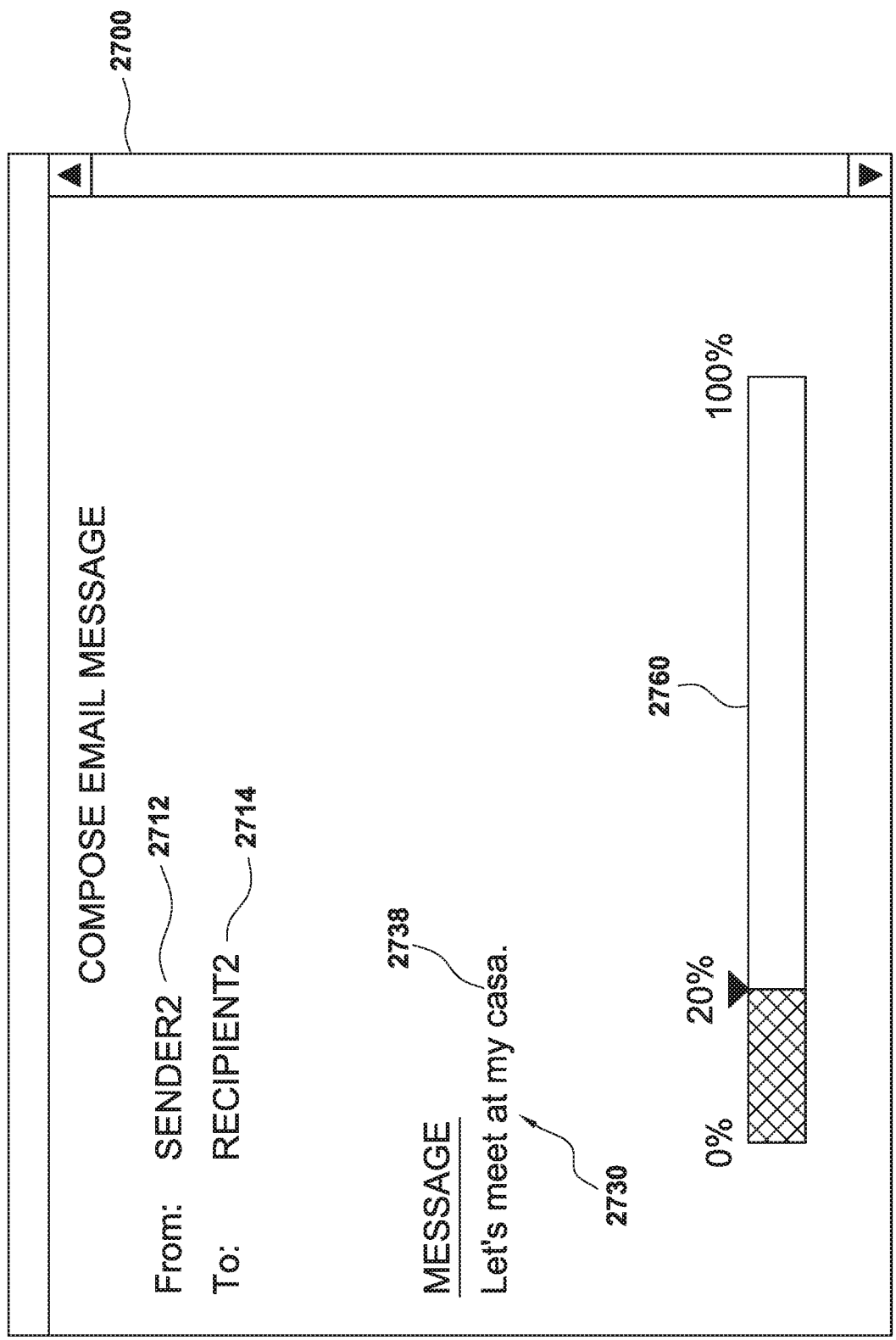
FIG. 27 shows a page on which a user may compose an email message in accordance with an embodiment.

In another embodiment, a percentage or portion of a message to be translated may be controlled by a user. For example, FIG. 27 shows a page 2700 that allows a user to compose an email message in accordance with an embodiment. Page 2700 includes a sender field 2712 and a recipient field 2714. In the illustrative embodiment, the user composes an email message 2730. Page 2700 also includes a slider 2760 that allows the user to select a percentage between zero and one hundred percent. The user may adjust slider 2760 to indicate a desired percentage. After the user selects a percentage, CLT App 862 translates the selected percentage of the words in message 2730 from a first language into a second language. If it is not possible to translate exactly the selected percentage of words, then CLT App 862 translates approximately the selected percentage of words. In the illustrative embodiment of FIG. 27, the user adjusts slider 2760 to indicate twenty percent (20%). CLT App 862 therefore translates twenty percent of the words of message 2730. For example, word 2738 of the message has been translated from English to Spanish. In other embodiments, a user may select a percentage of words in another manner, for example, by adjusting a graphic illustration of a dial, by adjusting a pointer, or by adjusting another type of indicator, or by typing a percentage number into a field. Other types of indicators may include, for example, a bar, an arch, or a circle presented to convey relative position on a computer screen or smartphone or device.

In one embodiment, a the percentage selected by the user approaches one hundred percent (100%) translation, CLT App 862 may present a suggest completion of second language text that may include possible modification with regard to tense, possession, word relationships and context, conjugation, etc., and repositioning of words of the second language to approximate or meet the proper form of the second language.

In another embodiment, a user may speak into microphone 839 of user device 860. Voice recognition module 837 converts the voice signals into text, and CTL App 862 translates selected words in the text into the user's target language. The text may be stored in a text file, placed into an email message, placed into a tweet, posted on a page associated with social media platform 845, etc.

In another embodiment, a translated word may be placed at the bottom of a page for user reference.

In another embodiment, translated words in a partially-translated text are displayed in a color different from the other words (or in bold).

In another embodiment, the user may specify a percentage of words in the original communication or message that are to be translated. CLT App 862 then translates words in the communication or message in accordance with the specified percentage.

In other embodiments, contextual language translation functions described herein (e.g., as performed by CLT App 862) may be performed in a similar manner to a different type of message received by or generated by a message server or other processor, such as a tweet, a SMS message, an instant message, a text message, a web page, an article, a document, and a message posted on a social media platform, etc. The contextual language translation function may be performed by an application on a user device, by software running on the message server, or by another processor.

In another embodiment, a contextual language translation processor is a component of a custom keyboard application available for a smartphone. In another embodiment, a contextual language translation processor is a component of a keyboard application operating in a browser of a personal computer, a laptop computer, or tablet device.

In another embodiment, a processor or platform that provides cartoons and puzzles for conventional print media, and/or a social media illustration platform such as Pinterest, displays a plurality of first words and selectively translate second words in accordance with one or more predetermined criteria. The predetermined criteria may be associated with a phonetic or pinyin interpretation of the transliterated second words within the cartoon, puzzle, or illustration.

In another embodiment, a message containing first words in a first language and second words in a second language. In response to a selection of the user or other criteria, the entire message may be translated into the first language, entirely into the second language, or entirely into a third language.

In another embodiment, selected words within a text are translated into emojis (which are well-known symbolic representations of words and are frequently used in email messages, text messages, etc.). The partially translated message containing words and emojis is sent to a recipient, posted on a social media website, etc.

In one embodiment, the first language phonetic or pinyin interpretation of the sound of the second language may be displayed as part of a translated word when the writing system of the second language is different from the writing system of the first language.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   receiving, by a processor, a text message posted by a first user on a social media platform, the text message comprising a plurality of words in a first language, before the message is displayed on the social media platform;
   selecting, by the processor, one or more words among the plurality of words, based on one or more predetermined criteria;
   translating the one or more selected words from the first language to the second language;
   causing the text message to be posted on the social media platform, wherein first words that are in the plurality of words and are not among the one or more selected words are posted in the first language and second words that are in the plurality of words and are among the one or more selected words are posted in the second language;
   causing a second user device to display a prompt to download software adapted to translate a portion of the text message into a third language;
   receiving from the second user device a request to download the software; and
   downloading the software to the second user device, in response to the request.

2. The method of claim 1, further comprising:
   receiving from the first user information specifying the first language and the second language.

3. The method of claim 2, further comprising:
   receiving from the first user a selection of a predetermined group of words; and
   selecting words among the plurality of words that are also in the predetermined group of words.

4. The method of claim 3, wherein the predetermined group of words include a plurality of vocabulary words associated with a particular activity.

* * * * *